United States Patent [19]

Metser et al.

[11] Patent Number: 5,357,562
[45] Date of Patent: Oct. 18, 1994

[54] AUTOMATED FACSIMILE/VOICE MEMORY MANAGING SYSTEM

[76] Inventors: Ram Metser, 110 Babcock St., Brookline, Mass. 02146; Ofer Reviv, 45 Sherman Rd., Chestnut Hill, Mass. 02167

[21] Appl. No.: 916,887

[22] Filed: Jul. 20, 1992

[51] Int. Cl.⁵ .................. H04M 1/64; H04M 11/00
[52] U.S. Cl. ......................... 379/67; 379/100; 379/97; 358/442; 358/468
[58] Field of Search .............. 379/67, 88, 89, 100, 379/97, 102; 358/400, 442, 468

[56] References Cited

U.S. PATENT DOCUMENTS

| | | | |
|---|---|---|---|
| 4,918,722 | 4/1990 | Duehren et al. | 379/100 |
| 4,994,926 | 2/1991 | Gordon et al. | 379/100 |
| 5,008,926 | 4/1991 | Misholi | 379/89 |
| 5,062,133 | 10/1991 | Melrose | 379/67 |

*Primary Examiner*—James L. Dwyer
*Assistant Examiner*—Fan Tsang
*Attorney, Agent, or Firm*—Testa, Hurwitz & Thibeault

[57] ABSTRACT

An automated facsimile/voice memory managing system includes a facsimile board for receiving and transmitting facsimile document information through a telephone line, a voice response board for receiving and transmitting voice information through a telephone line; a storage device for storing voice information and facsimile document information, and a central processing unit (CPU) for controlling the facsimile board and the voice response board in response to the selection of different keys of a touch-tone telephone by, for example, an administrator of the system, without the use of a keyboard, printer, or monitor, to, for example, change different parameters of the system configuration, store new voice information in the storage device for use by a subsequent user of the system, and store new facsimile document information in the storage device for later transmission to a subsequent user of the system.

2 Claims, 17 Drawing Sheets

AUTOMATED FACSIMILE/VOICE MEMORY MANAGING SYSTEM

BACKGROUND OF THE INVENTION

The present invention relates generally to electronic delivery of information, and more particularly, is directed to an automated facsimile/voice memory managing system.

The use of facsimile machines, in which a person can send a document to another person over public telephone lines has become widespread. As a result thereof, various systems have been developed in which a person can access a computer at a central location via a touch-tone telephone and have the computer automatically transmit one or more stored documents to the person's facsimile machine. The systems are typically complicated. For instance, in order for a system administrator to change the system parameters, such as restriction of the total number of documents that can be sent for each telephone call, a keyboard and a monitor/printer are required. Changing the system parameters is thus a complicated task that typically must be performed at the central location.

OBJECTS AND SUMMARY OF THE INVENTION

Accordingly, it is an object of the present invention to provide an automated facsimile/voice memory managing system that overcomes the problems with the aforementioned prior art.

It is another object of the present invention to provide an automated facsimile/voice memory managing system that delivers comprehensive voice processing and facsimile on-demand capabilities.

It is a further object of the present invention to provide an automated facsimile/voice memory managing system that does not require a keyboard, monitor, or printer for system configuration by the administrator of the system.

It is yet a further object of the present invention to provide an automated facsimile/voice memory managing system with a telephone-only input/output (TOIO) interface, that is, an automated facsimile/voice memory managing system that can be controlled by the end user and by the administrator of the system from a touch-tone telephone.

It is still another object of the present invention to provide an automated facsimile/voice memory managing system that includes voice recording and playback, DTMF (dual-tone multi-frequency) detection, and facsimile transmission and reception, while maintaining the telephone-only input/output (TOIO) interface.

It is yet another object of the present invention to provide an automated facsimile/voice memory managing system which performs real time, multitasking operations while operating in a non-multitasking environment such as DOS.

It is a further object of the present invention to provide an automated facsimile/voice memory managing system which utilizes relatively low cost hardware.

It is another object of the invention to provide an automated facsimile/voice memory managing system which can be connected to industry-standard single-line extensions of a PBX (private branch exchange), and which can "automatically" sample the PBX signaling characteristics of a telephone line to determine the actual values of these characteristics and then to use these determined values to properly interface with the telephone line and/or a telephone switching system, the sampling initiated by commands entered from a touch-tone telephone.

It is another object of the invention to provide an automated facsimile/voice memory managing system which is adapted to sample and "learn" the PBX signaling characteristics of a telephone line, the sampling and "learning" initiated by commands entered from a touch-tone telephone and not requiring any ongoing supervision or analysis by a technician.

It is another object of the invention to provide an automated facsimile/voice memory managing system adapted to be integrated with virtually all PBXs which accommodate industry-standard single-line telephones or peripherals.

In accordance with an aspect of the present invention, a method is provided for controlling an automated facsimile/voice memory managing system from a touch-tone telephone, the system having a system configuration and storage means for storing voice information and facsimile document information, the method comprising the steps of answering a telephone call made from the touch-tone telephone; instructing, by voice commands stored in the system, to select different keys on the touch-tone telephone in order to perform at least one of the following steps: vary different parameters of the system configuration, store new voice information in the system, and store new facsimile document information in the system; and performing at least one of the following steps in response to the selection of the different keys of the touch-tone telephone: changing the different parameters of the system configuration, actuating the system to store new voice information in the system for use by a subsequent user of the system, and actuating the system to store new facsimile document information in the system of transmission to a subsequent user of the system.

In a preferred embodiment of this aspect of the invention, the performing step may include, in response to the selection of a key of the touch-tone telephone: a) setting the maximum number of documents that can be retrieved by a user of the system during each telephone call by the user; b) determining whether to transit a cover page to a user of the system during each transmission of stored facsimile document information; c) setting the maximum number of times that the system will attempt to transmit facsimile document information to a user; d) determining whether transmission of facsimile document information to a user will be sent to the user over the same telephone line utilized by the user to order the facsimile document information or over a different telephone line; e) setting said system to operate behind a PBX extension by dialing a digit required as an outdialing prefix by the PBX; f) determining whether a facsimile document may be sent to an international telephone number; g) setting the time of the system; h) setting the date of the system; i) replacing stored voice information for use with a user, with stored and previously used voice information; j) replacing stored voice information for use with a user, with stored, factory-set default voice information; and k) resetting all parameters to original stored, factory-set default parameters.

In another preferred embodiment of this aspect of the invention, the step of performing includes the step of receiving a voice message from the touch-tone telephone and the telephone line, converting the voice message to digital form to form new voice information, and storing the new voice information in the system for use by a subsequent user of the system.

In another preferred embodiment of this aspect of the invention, the step of performing includes receiving new facsimile document information from a facsimile machine associated with the touch-tone telephone and through the telephone line, and storing the new facsimile document information in the system for transmission to a subsequent user of the system. Also, the step of storing new facsimile document information includes the step of cataloging the new facsimile document information in the system in correspondence with numerical indicia which can be accessed by a subsequent user in response to activation of the keys of a touch-tone telephone corresponding to the numerical indicia.

In accordance with another aspect of the present invention, an automated facsimile/voice memory managing system includes facsimile means for receiving and transmitting facsimile document information through a telephone line; voice response means for receiving and transmitting voice information through a telephone line; secondary storage means for storing voice information and facsimile document information; and central processing means for controlling the facsimile means and the voice means to perform at least one of the following steps in response to the selection of different keys of a touch-tone telephone: change different parameters of the system configuration, store new voice information in the secondary storage means of the system for use by a subsequent user of the system, and store new facsimile document information in the secondary storage means for later transmission to a subsequent user of the system.

In a preferred embodiment of this aspect of the invention, facsimile means includes a modem.

In another aspect, the invention features a method for controlling an automated facsimile/voice memory managing system adapted to allow voice recording and playback and facsimile transmission and reception, where the method comprises the steps of providing a telephone for accessing the system, and changing a configuration parameter of the system via the telephone.

In yet another aspect, the invention features an automated facsimile/voice memory managing system comprising facsimile means for receiving and transmitting facsimile document information through a telephone line, voice response means for receiving and transmitting voice information through a telephone line, central processing means for controlling the facsimile means and the voice response means, and a telephone for controlling the facsimile means, the voice response means, and the central processing means to change a configuration parameter of the system.

In still another aspect, the invention features an automated facsimile/voice memory managing system comprising facsimile means for receiving and transmitting facsimile document information through a telephone line, voice response means for receiving and transmitting voice information through a telephone line and central processing means for controlling the facsimile means and the voice response means, where the facsimile means, the voice response means, and the central processing means are adapted to be controlled by a telephone and to allow a configuration parameter of the system to be changed via the telephone.

In another aspect, the invention features an automated facsimile/voice memory managing system comprising facsimile means for receiving signals from and transmitting signals to a telephone switching system, at least one voice response means for receiving signals from and transmitting signals to the telephone switching system, and central processing means for controlling the facsimile means and the at least one voice response means, where the facsimile means, the at least one voice response means, and the central processing means are adapted to allow a telephone to initiate a process by which values of signalling characteristics associated with the telephone switching system are automatically determined by the system.

Preferred embodiments of this aspect of the invention include the following features. The at least one voice response means comprises a first voice response means and a second voice response means. The signals received and transmitted by the at least one voice response means include the signalling characteristics associated with the telephone switching system. The signals received and transmitted by the at least one voice response means include voice information. The signals received and transmitted by the facsimile means include the signalling characteristics associated with the telephone switching system. The signals received and transmitted by the facsimile means include facsimile document information. The telephone controls the facsimile means, the at least one voice response means, and the central processing means to change a configuration parameter of the system.

In another aspect, the invention features an automated facsimile/voice memory managing system comprising facsimile means for receiving signals from and transmitting signals to a first telephone switching system, at least one voice response means for receiving signals from and transmitting signals to a second telephone switching system, and central processing means for controlling the facsimile means and the at least one voice response means, where the facsimile means, the at least one voice response means, and the central processing means adapted to allow a telephone to initiate a process by which values of signalling characteristics associated with the first or the second telephone switching system are automatically determined by the system.

Advantages of the invention include a simple, user-friendly telephone-only input/output (TOIO) interface that eliminates the need for a keyboard, monitor, or printer to control the system and change system parameters. Also, because the system does not require a keyboard, monitor, or printer, it is relatively inexpensive.

Also, the system may be used with a telephone switching system such as a PBX or a telephone company central office (or both) to automatically determine the values of unknown signalling characteristics without the need for monitoring or assistance by a trained technician. The determined values can be used to setup a working interface between the system and the telephone switching system. This embodiment of the invention provides a simple, user-friendly automatic setup process that does not require a trained technician.

The above and other objects, aspects, features, and advantages of the invention will become readily apparent from the following description thereof, which is to be read in connection with the accompanying drawings.

DESCRIPTION

The drawings are first briefly described.

Figure 1A:
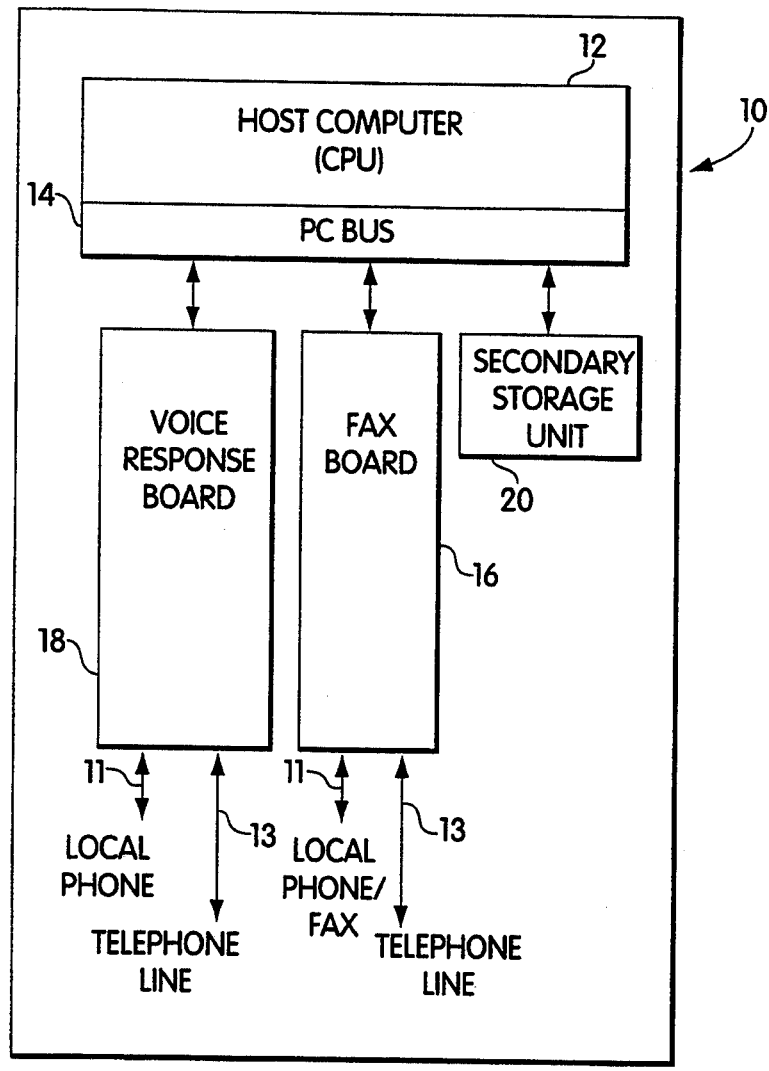
FIG. 1a is a schematic diagram of an automated facsimile/voice memory managing system.

Referring to the drawings in detail, and initially to FIG. 1a, an automated facsimile/voice memory managing system 10 according to the present invention includes a host computer 12 which is connected through a bus 14 to a facsimile transmission/reception board 16 and a voice response board 18. A secondary storage unit 20, e.g., an AT compatible hard disk, is connected with host computer 12 to store various facsimile documents and voice messages. Facsimile transmission/reception board 16 and voice response board 18 each have two standard telephone line interfaces 11 and 13 to allow connections to, respectively, an outside telephone line and a local touch-tone telephone (or facsimile machine). Typically, two or four wire connectors, e.g., RJ-11 jacks, are used to make the physical connections between the boards and the telephone lines, telephones, and facsimile machines. Standard telephone line interfaces 11 and 13 accommodate ring detection and call progress analysis, and use hook relays which switch the boards from the on-hook state to the off-hook state.

Figure 1B:
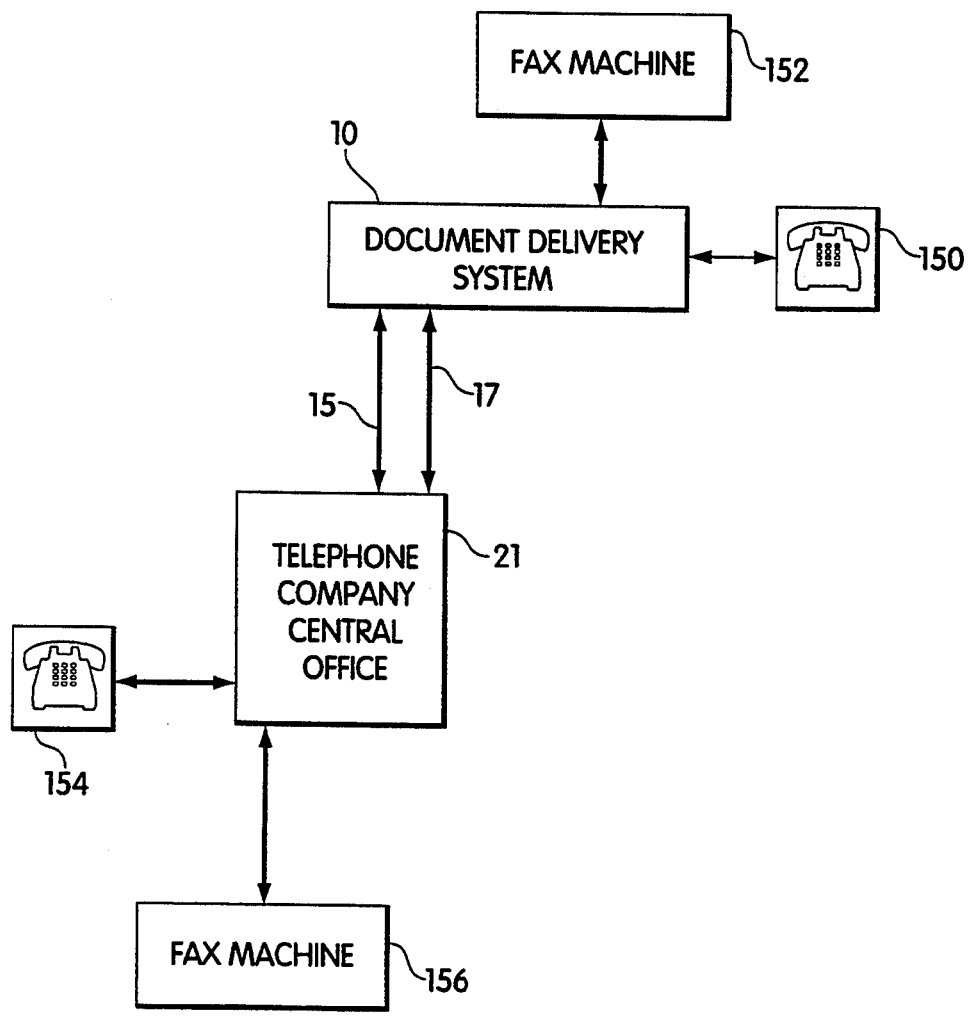
FIGS. 1b through 1f are block diagrams of some possible configurations involving the automated facsimile/voice memory managing system.
Figure 1C:
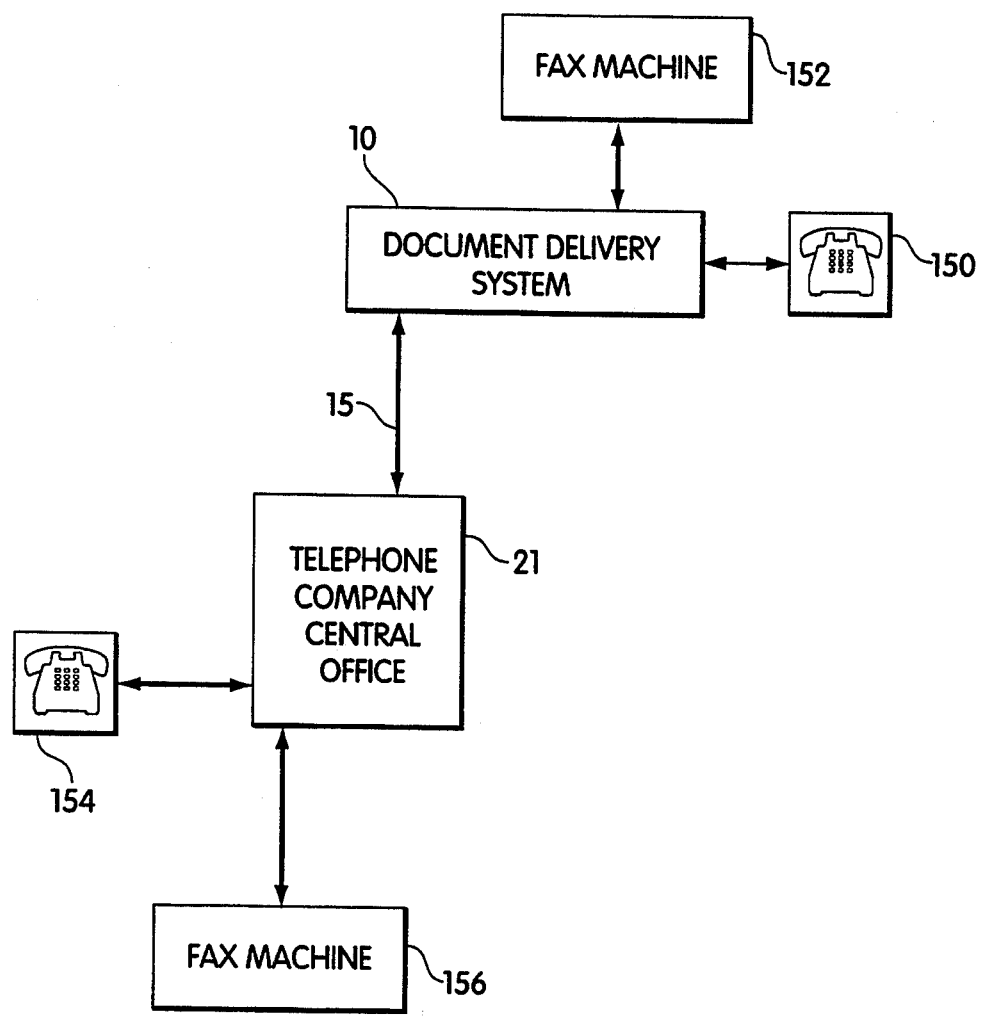

Referring to FIGS. 1b and 1c, each board 16 and 18 within system 10 can be connected to a telephone company central office 21 via separate outside telephone lines 15 and 17 (FIG. 1b), or both boards can share the same outside telephone line 15 (FIG. 1c). In either case, it is possible to connect a local touch-tone telephone 150 (typically to voice response board 18) and a local facsimile machine 152 (typically to fax board 16) to system 10. A remote touch-tone telephone 154 and a remote facsimile machine 156 can be connected to central office 21. (Both local and remote facsimile machines 152 and 156 typically include a touch-tone telephone.) System 10 can be controlled by telephones 150, 154 and/or facsimile machines 152, 156.

Figure 1D:
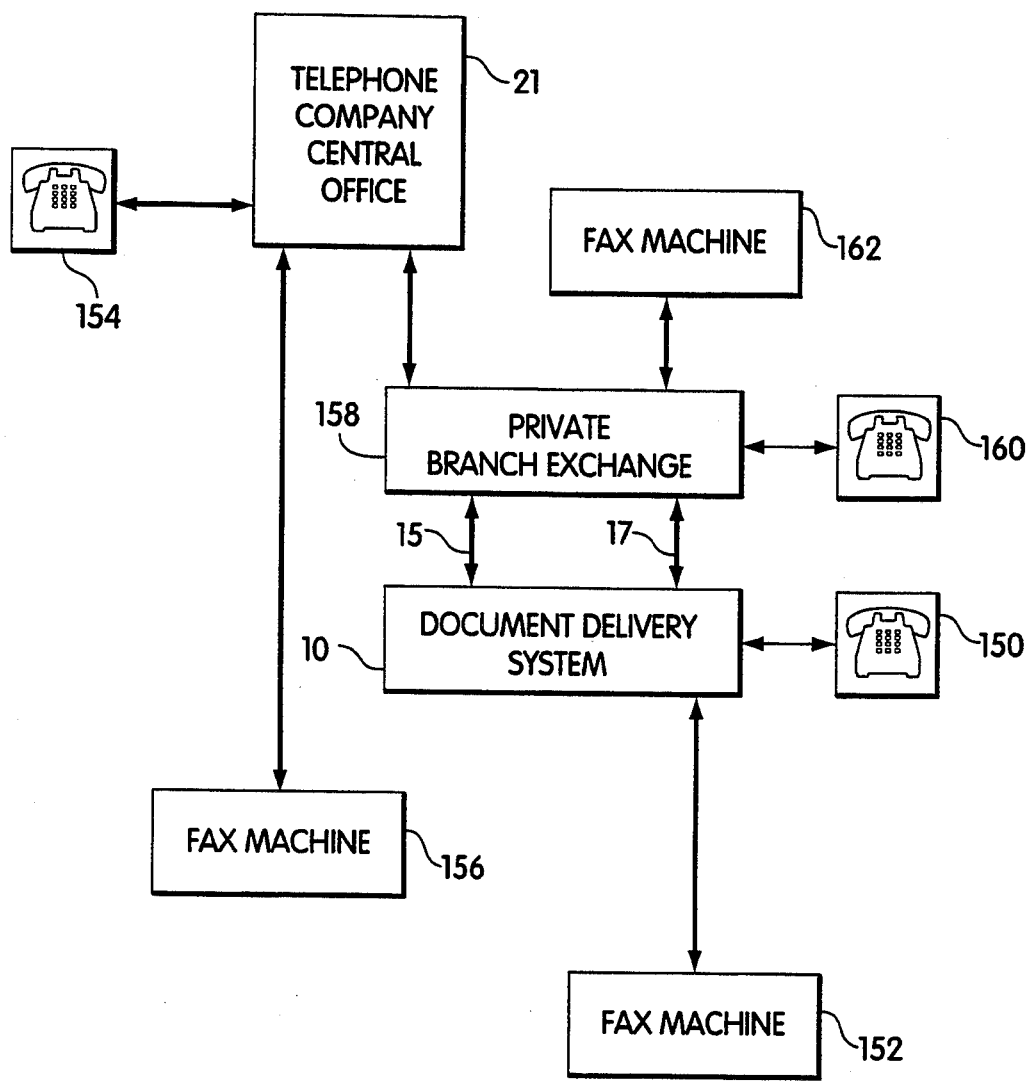
Figure 1E:
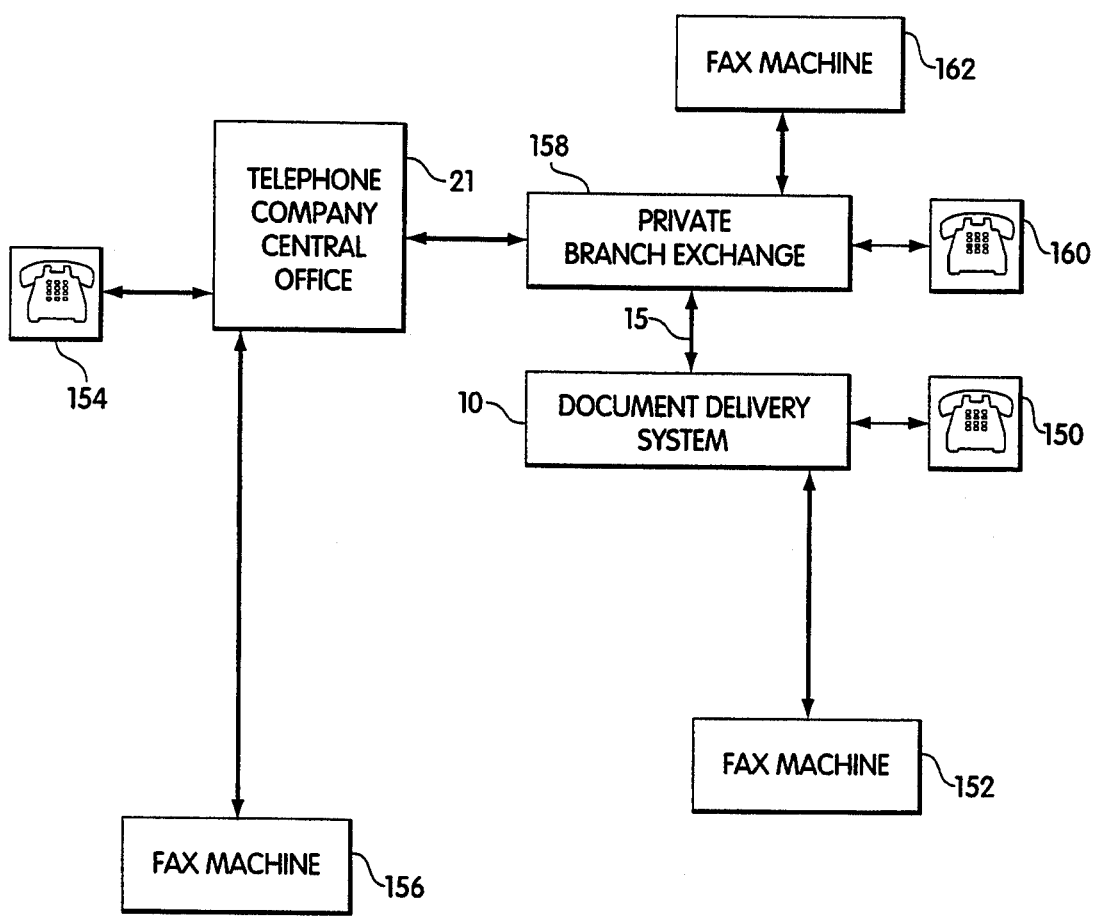
Figure 1F:
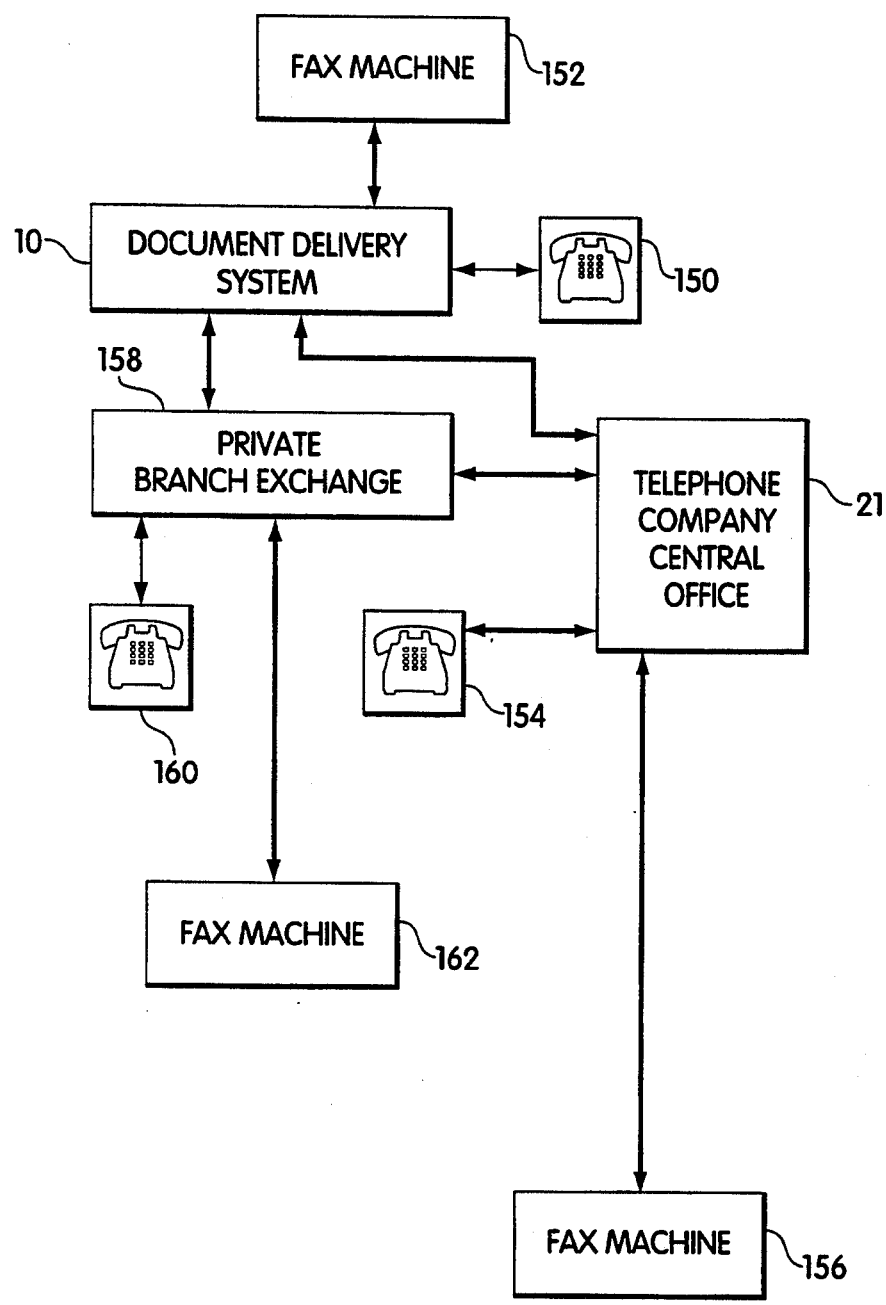

Referring to FIGS. 1d, 1e, and 1f, it is also possible to connect system 10 to central office 21 via a PBX 158 (private branch exchange). Similar to FIGS. 1b and 1c, each board 16 and 18 within system 10 can be connected to central office 21 through PBX 158 via separate lines 15 and 17 (FIG. 1d), or both boards can share the same line 15 (FIG. 1e). Also, as shown in FIG. 1f, one board within system 10 (e.g., board 18) can be connected to central office 21 through PBX 158 with one line 15, while the other board within system 10 (e.g., board 16) can be connected directly to central office 21 with line 17. In any case, it is possible to connect local touch-tone telephone 150 (typically to voice response board 18) and local facsimile machine 152 (typically to fax board 16) to system 10. Remote touch-tone telephone 154 and remote facsimile machine 156 can be connected to central office 21. Also, a touch-tone telephone 160 and a facsimile machine 162 can be connected to PBX 158. System 10 can be controlled by telephones 150, 154, 160 and/or facsimile machines 152, 156, 162. The connection of system 10 to central office 21 through PBX 158 is described below with reference to FIGS. 5 through 10.

Referring again to FIG. 1a, facsimile transmission/reception board 16 includes a facsimile modem having a data pump (not shown) and a micro-controller unit (not shown), as is conventional. These elements of facsimile transmission/reception board 16 handle the actual encoding and decoding of data to facsimile format according to established CCITT standards. Facsimile transmission/reception board 16 also includes a read only memory (ROM) (not shown) which stores software that is used to implement the CCITT standard and that performs the encoding/decoding protocol of the facsimile data, as well as the communication protocol between Group III compatible facsimile machines. An example of such a facsimile transmission/reception board 16 is a 24/96 facsimile board sold by Dallas Fax.

Voice response board 18 includes a DTMF (dual-tone multi-frequency) decoder which is utilized to convert DTMF signals into characters that can be manipulated by host computer 12. In addition, voice response board 18 includes active filtering devices and analog to digital (A/D) and digital to analog (D/A) circuitry used to convert between analog voice and digital format, in order for the data to be manipulated by system 10. An example of a voice response board 18 that can be used is one sold by Talking Technology, Inc. under the designation "BIGMOUTH BOARD".

By means of computer 12, and particularly, the software therein, facsimile and voice messages can be received and transmitted. Host computer 12 is conventional and includes a central processing unit (CPU), a random access memory (RAM), a read-only memory (ROM). For example, host compute 12 can be any AT compatible computer having at least an 80286 CPU running at 12 MHz.

The software used with host computer 12 controls system 10 (e.g., facsimile transmission/reception board 16, voice response board 18, and secondary storage unit 20) in order to supply appropriate voice and/or facsimile responses to a system user or a system administrator. The software includes three independent modules.

One module is a facsimile board driver that controls facsimile transmission/reception board 16 to operate under the conditions of G3 transmission/reception in compliance with T30 and T4 CCITT standards.

Facsimile transmission/reception board 16 and voice response board 18 do not have on-board processors. Since voice response board 18 relies heavily on host computer 12 to create good quality, intelligible sounds, computing time taken from host computer 12 for other activities (e.g., facsimile transmission) will tend to severely degrade voice quality. In order to solve this problem, the facsimile driver of the software uses an event driven state that constantly monitors the nature of the current activity in system 10. The facsimile board driver knows when host computer 12 is engaged in voice-related activity and can automatically lower the facsimile transmission/reception board's consumption of the host computer's computational resources to maintain the quality of the voice while also maintaining facsimile transmission. However, when the processing load is not directly related to any voice activity, the facsimile board driver raises the consumption of computing resources, that is, permits host computer 12 to perform its full schedule of activities. This operation is shown by the flow chart of FIG. 4. As a result thereof, a wide variety of Class 2 (EIA 2238 standard) facsimile/modems can be used.

Figure 4:
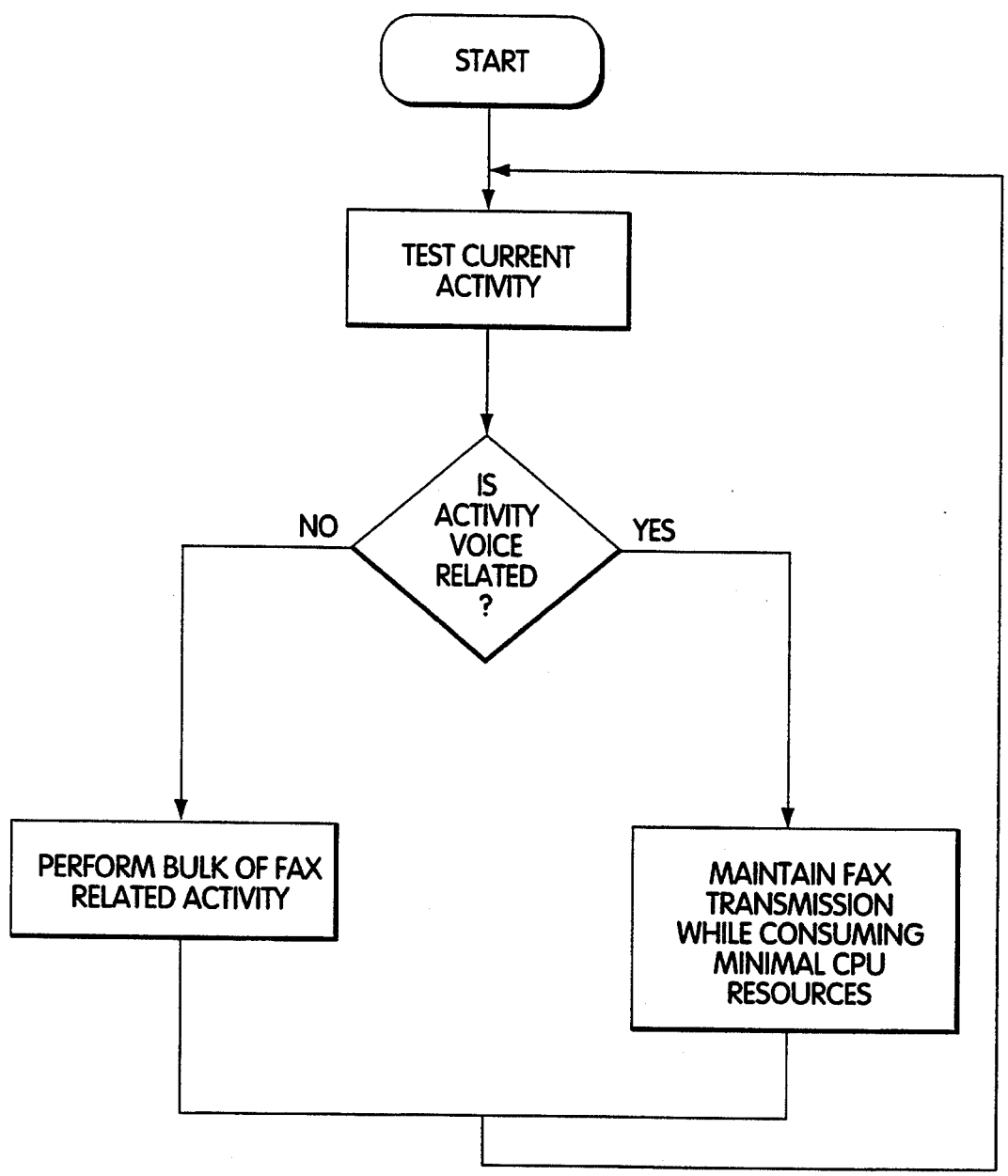
FIG. 4 is a flow chart diagram of an operation performed by the facsimile board driver module.

In the disclosed embodiment, system 10 operates under a non-multitasking operating system such as DOS. System 10 can perform real time, multitasking operations while operating in this non-multitasking environment. The operation previously described with reference to FIG. 4 is an example of such a real, time multitasking operation performed under a non-multitasking operating system.

The facsimile board driver also handles the initial loading of documents and can be configured easily to fit a wide range of facsimile requirements.

The second software module is a voice response driver that manipulates low-level, voice-related system activity. The voice response driver supports record and playback functions, DTMF detection, and the interception and manipulation of hardware-related call progress activities.

The third and final software module is an application module which controls the voice board driver and facsimile board driver, and handles the functional flow of each call handled by system 10. The application module accommodates the telephone-only input/output (TOIO) interface without downgrading the ability of system 10 to perform a variety of functions.

In addition to the standard administrative functions such as voice recording and document loading, the application module permits the administrator of system 10 to fully configure the system to fit particular needs, such as facsimile cover page handling, restriction of the total number of documents being sent for each telephone call, the ability to restore all configuration parameters to their original factory default setting, one line same call, two line call back, or one line call back telephone line operation, and the like. The application module also implements a unique filing system which corresponds to the actual DTMF entry that is required in order to retrieve that specific file. For example, by accessing menu number 2, sub-menu 2, the user of system 10 is actually asking for the internally stored document number 22. As a result, this permits a system wide file naming convention, compatibility between two different types of files, that is, between voice and documents, and clarifies the user-administrator interface.

The software will be described below with respect to the flow chart diagrams of FIGS. 2 and 3.

Loading of voice messages and facsimile documents into secondary storage unit 20, and changing of parameters of the system, can be accomplished by means of a touch-tone telephone and a facsimile machine (e.g., for loading of facsimile documents). A flow chart diagram showing the sequence of operations therefor, is shown in FIG. 2.

Figure 2A:
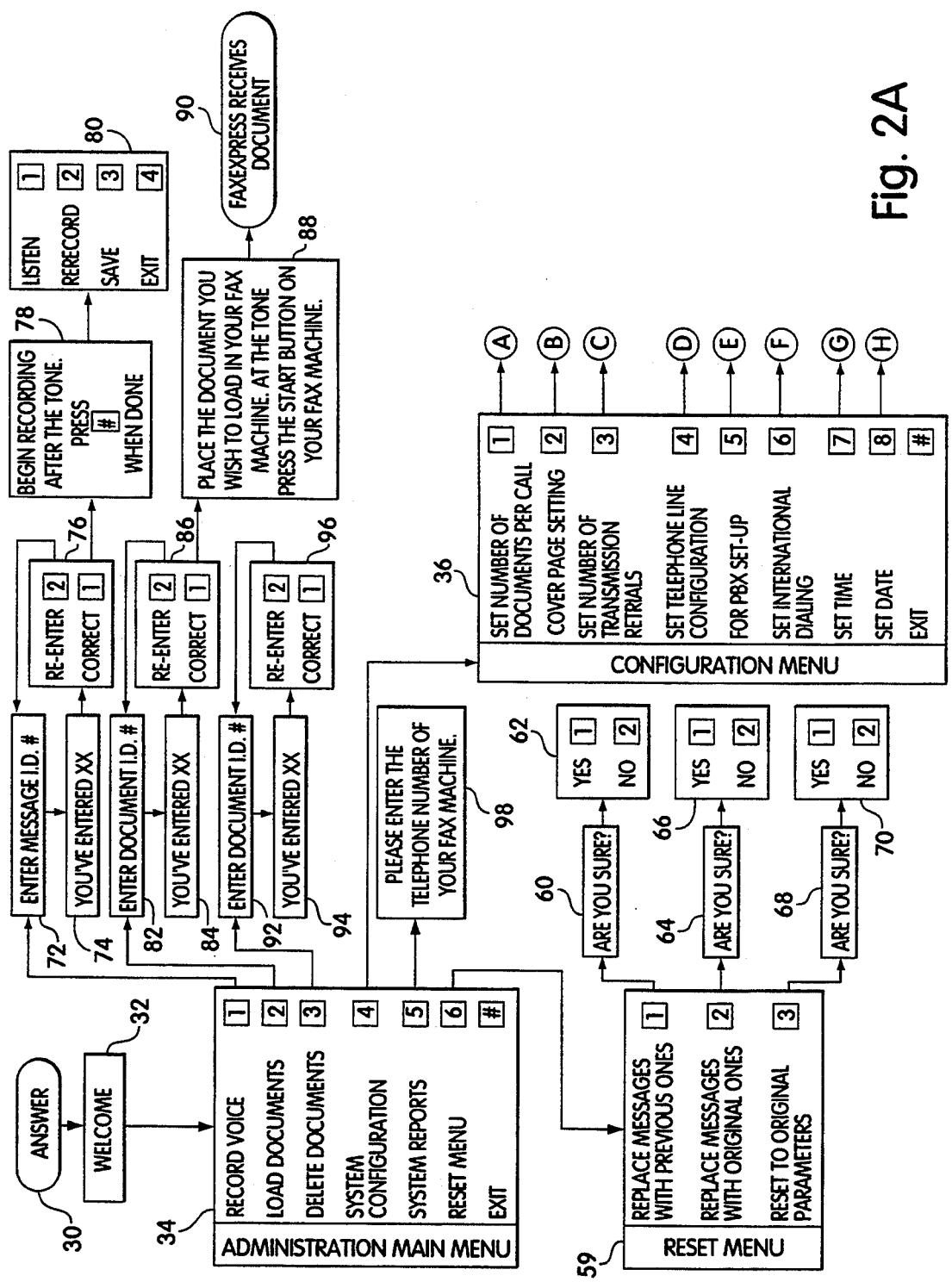
FIG. 2 is flow chart diagram of operations which an administrator of the system can perform.
Figure 2B:
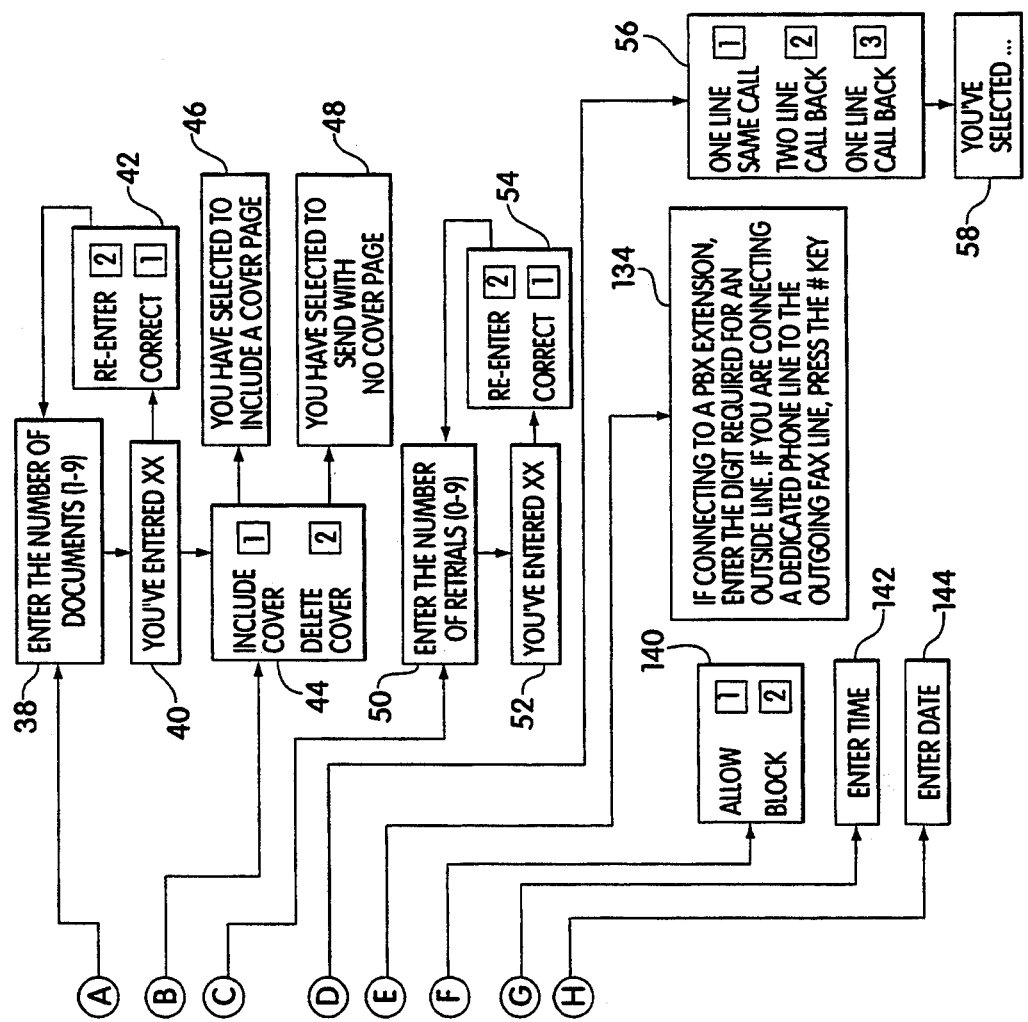

Referring to FIG. 2, the system administrator or other person in control of system 10, dials the telephone number for system 10 from a local or remote touch-tone telephone unit. If the administrator desires to load facsimile documents into system 10, such telephone call is made from the telephone conventionally connected to each facsimile machine. System 10 answers the telephone call in step 30 and the administrator then dials a valid access code. Upon reception of the valid access code, system 10 supplies a welcome stored voice message from secondary storage unit 20 to voice response board 18 in step 32, where it is then transmitted to the telephone unit being used by the administrator. The welcome stored voice message will also inform the administrator of the various options available in response to depressing the different touch-tone keys on the administrator's telephone unit.

In the main menu (step 34), the administrator of system 10 has the option of recording a voice message by depressing the "1" key, loading facsimile documents into secondary storage unit 20 by depressing the "2" key, deleting facsimile documents from secondary storage unit 20 by depressing the "3" key, setting system operating parameters (i.e., changing the system configuration) by depressing the "4" key, receiving a system activity report by pressing the "5" key, resetting system voice message or parameters to a previous setting by pressing the "6" key or depressing the "#" key to exit system 10.

In the main menu of step 34, the administrator can record a voice message, which is stored in secondary storage unit 20. Specifically, the administrator can record the welcome voice message of step 102 to be described hereinafter, the main menu voice message of step 104 to be described hereinafter, the voice message of the sub-menus which will be explained hereinafter with respect to step 106, and the goodbye voice message which will also be described hereinafter with respect to step 122.

Thus, after depressing the "1" key in step 34, a stored voice message will be supplied in step 72, and will ask the administrator to select a number (generally from 00 to 99) corresponding to the message to be recorded, by depressing the touch-tone keys of the keypad of the administrator's telephone unit. The administrator will generally have a sheet indicating the different message positions and the corresponding numbers. For example, the following partial list could be used.

| 10 | Sub menu /A |
| 20 | Sub menu /B |
| 30 | Sub menu /C |
| 40 | Sub menu /D |
| 50 | Sub menu /E |
| 90 | Welcome message |
| 91 | Main menu |
| 99 | Goodbye message |

Then, system 10 will repeat the number entered by the administrator in step 74, and request the administrator to confirm the number by depressing "1" if correct and by depressing "2" if incorrect. In step 76, if the administrator depresses the "2" key, the operation returns to step 72. However, if the number is correct such that the administrator depresses the "1" key, the operation commences to step 78. In step 78, system 10 then instructs, by means of a stored voice message, that the administrator should record the message after the tone delivered to the administrator, and the administrator should press the "#" key when the message is completed. After the message has been recorded and the "#" key has been depressed, system 10 advises in step 80 that the administrator can listen to the newly recorded message by depressing the "1" key, re-record the message by depressing the "2" key, save the message by depressing the "3" key or exit, with no change to the recorded message, to the main menu of step 34 by depressing the "4" key.

In step 80, if the "1" key is depressed, the just recorded message is repeated to the administrator, and the process returns to step 80. If the "2" key is depressed, the process returns to step 78 so that the administrator can re-record the message. If the "3" key is depressed, the just recorded message is saved by computer 12 in secondary storage unit 20, and the operation returns to main menu of step 34. If the "4" key is depressed, the just recorded message is not saved, and the process returns to step 34.

In step 34, if the administrator desires to load facsimile documents into secondary storage unit 20, the "2" key is depressed. In step 82, system 10 requests the administrator to enter the two digit identification number corresponding to the document to be loaded into memory. For example, a plurality of documents can be provided for each sub-menu as follows:

| Document | I.D. Number | Document | I.D. Number |
|----------|-------------|----------|-------------|
| SUB-MENU A | | SUB-MENU B | |
| A-1 | 11 | B-1 | 21 |
| A-2 | 12 | B-2 | 22 |
| A-3 | 13 | B-3 | 23 |
| A-4 | 14 | B-4 | 24 |
| A-5 | 15 | B-5 | 25 |
| SUB-MENU C | | SUB-MENU D | |
| C-1 | 31 | D-1 | 41 |
| C-2 | 32 | D-2 | 42 |
| C-3 | 33 | D-3 | 43 |
| C-4 | 34 | D-4 | 44 |
| C-5 | 35 | D-5 | 45 |
| SUB-MENU E | | | |
| E-1 | 51 | | |
| E-2 | 52 | | |
| E-3 | 53 | | |
| E-4 | 54 | | |
| E-5 | 55 | | |

Preferably, the cover page for a facsimile document corresponds to identification number 00.

System 10 will then repeat the number entered by the administrator in step 84, and request the administrator to confirm the number by depressing "1" if correct and by depressing "2" if incorrect. In step 86, if the administrator depresses the "2" key, the operation returns to step 82. However, if the number is correct such that the administrator depresses the "1" key, the operation commences to step 88. In step 78, system 10 then instructs, by means of a stored voice message, that the administrator should place the document to be stored in the administrator's facsimile machine and push the button to send the document via Fax modem and the telephone lines to system 10 where it is received by Fax board 16 and stored in secondary storage unit 20. In step 90, when the document is received and stored, control of system 10 is returned to the administrator, and the operation returns to main menu of step 34.

In a similar manner, if it is desired to delete a facsimile document from storage, the "3" key is depressed in step 34. Then, in step 92, system 10 requests the administrator to enter the two digit identification number corresponding to the document to be deleted from memory. System 10 repeats the number entered by the administrator in step 94, and requests the administrator to confirm the number by depressing "1" if correct and by depressing "2" if incorrect. In step 96, if the administrator depresses the "2" key, the operation returns to step 92. However, if the number is correct such that the administrator depresses the "1" key, the operation returns to step 34.

If the "4" key is depressed from step 34 to change the system configuration, the operation moves to step 36 where the administrator receives on-line, voice instructions from voice messages stored in secondary storage unit 20 and through voice response board 18. Specifically, as shown in step 36, the voice instructions require the administrator to depress one of the following keys on the touch-tone keypad of the administrator's telephone unit, to activate the different commands:

| | |
|---|---|
| "1" | to set (or change) the number of documents allowed per call, |
| "2" | to include (or remove) a cover page with facsimile transmissions, |
| "3" | to set the number of transmissions retries of facsimile documents to a user, |
| "4" | to set telephone line configuration, |
| "5" | to set the system for operation using a PBX extension, |
| "6" | to set (allow or block) international calling, |
| "7" | to set system time, |
| "8" | to set system date, |
| "#" | to exit to the main menu of step 34. |

Specifically, when "1" is depressed, the operation moves to step 38, where a stored voice message is transmitted by voice response board 18 to the administrator's telephone unit, requesting that the administrator enter the number of documents that each user of system 10 may receive during each telephone call. After the administrator depresses the appropriate number, computer 12 reads the appropriate voice message corresponding thereto from memory, whereupon voice response board 18 advises the administrator of the number that has been chosen in step 40. In step 42, the administrator is requested to verify this number by depressing the "1" key or to request re-entry of a new number by depressing the "2" key. If the "2" key is depressed, the operation returns to step 38. If the "1" key is depressed, system 10 internally adjusts this parameter, that is, the number of documents per call, by changing the memory designation, and then returns to the configuration menu of step 36, thereby requesting the administrator to select any other key.

If the "2" key is depressed in step 36, the operation proceeds to step 44, where the administrator, by way of a pre-recorded voice message, is requested to depress the "1" key if a facsimile document is to include a cover page or the "2" key if the cover page for a facsimile document is to be deleted. If the "1" key is depressed, computer 12 provides a designation in memory to include a cover page with each facsimile document and a stored voice message is supplied to the administrator, in step 46, as follows: "You have selected to include a cover page. Please load is as document number 00." The document information can be loaded at a later time, as will be described hereinafter. The operation then returns to the configuration menu of step 36, where the choices are once again supplied to the administrator. If the "2" key is depressed, computer 12 provides a designation in memory to not include a cover page with each facsimile document, and a stored voice message is supplied to the administrator, in step 48, as follows: "You have selected to transmit without a cover page." The operation then returns to the configuration menu of step 36, where the choices are once again supplied to the administrator.

If the "3" key is depressed in step 36, the operation moves to step 50, where a stored voice message is transmitted by voice response board 18 to the administrator's telephone unit, requesting that the administrator enter the number of re-trials that are permitted to retrieve a document by a user of system 10. After the administrator depresses the appropriate number, preferably limited between zero and nine, computer 12 reads the appropriate voice message corresponding thereto from memory, whereupon voice response board 18 advises the administrator of the number that has been chosen in step 52. In step 54, the administrator is requested to verify this number by depressing the "1" key or to request re-entry of a new number by depressing the "2" key. If the "2" key is depressed, the operation returns to step 50. If the "1" key is depressed, system 10 internally adjusts this parameter, that is, the number of re-trials that are permitted, by changing the memory designation, and then returns to the configuration menu of step 36, thereby requesting the administrator to select any other key.

If the "4" key is depressed in step 36, this indicates that the administrator desires to set the system for one line same call, two line call back, or one line call back telephone line operation. Accordingly, the operation moves to step 56, where a stored voice message is transmitted by voice response board 18 to that administrator's telephone unit, requesting that the administrator depress the "1" key for one line same call operation, or depress the "2" key for two line call back operation, or depress the "3" key for one line call back operation. After the administrator depresses the appropriate number, computer 12 reads the appropriate voice message corresponding thereto from memory, whereupon voice response board 18 advises the administrator of the number that has been chosen in step 58. Thereupon, the operation returns back to the configuration menu of step 36. A verification step similar to steps 42 and 54 can provided after step 58.

The "5" key is depressed in step 36 if the administrator desires to set the system to operate behind a PBX extension (or to change a previous PBX setup). If this option is selected, the prefix digit or digits that are needed to secure an "outside" telephone line must be entered. After depressing the "5" key in step 36, system 10 will proceed to step 134 and play a voice message through the voice response board 18 asking the administrator to depress the key on the telephone keypad that corresponds with the digit required to get the outside line, or to press the "#" key if the system is not connected to a PBX extension but to a dedicated central office line. After depressing the appropriate key the process then returns to step 36. After setting the PBX feature, system 10 will automatically use the prefix digit or digits when necessary, wait for a dial tone, and then proceed to dial the actual telephone number.

If the "6" key is depressed from step 36, system 10 will proceed to step 140 whereby a voice message will be played through voice response board 18 asking the administrator to depress the "1" key if international outdialing (when transmitting facsimile documents) is to be allowed or the "2" key if international outdialing is to be blocked. After depressing the appropriate key, the process returns to step 36.

If the "7" key is depressed from step 36, it will indicate to system 10 that the system time is to be set. The system will proceed to step 142, and play a voice message instructing the administrator to depress the keys which correspond with the desired time. For example, to enter 11:00 the keys "1", "1", "0", and "0" must be depressed, in that order. After depressing the appropriate key(s), the process returns to step 36.

If the "8" key is depressed from step 36, it will indicate to system 10 that the system date is to be set. The system will proceed to step 144 and play a voice message instructing the administrator to depress the keys which correspond with the desired date. For example, to enter June 5, 92, the keys "0", "6", "0", "5", "9", and "2" must be depressed, in that order. After depressing the appropriate key the process then returns to step 36.

If the administrator depresses the "#" key in the configuration menu step 36, the system exits to the main menu of step 34, and any parameters that were changed are fixed at the value to which they were changed.

From step 34, if the administrator depresses the "5" key to generate a system activity report, the system proceeds to step 98 where the administrator is asked to enter the telephone number of the receiving facsimile machine. After entering the telephone number, system 10 repeats the number entered by the administrator and asks the administrator to press the "1" key if the number is correct or to press the "2" key to re-enter the telephone number. After receiving confirmation from administrator, system 10 transmits a system report containing details about previous facsimile transmissions to the facsimile machine designated by the administrator.

In step 34, if the "6" key is depressed, system 10 proceeds to step 59 where a voice message is played through the voice response board requesting the administrator to depress the "1" key if the administrator desired to replace currently used voice messages with the stored voice messages used prior to the last change thereof, to depress the "2" key if the administrator desired to replace currently used voice messages with the original factory recorded voice messages, or depress the "3" key if the administrator desires to reset all of the system's configuration parameters to their original factory settings.

From step 59, if the "1" key is depressed to indicate that the administrator desires to replace currently used voice messages with the stored voice messages used prior to the last change thereof, system 10 proceeds to step 60 asking the administrator for confirmation, and then proceeds to step 62 asking the administrator to respond by depressing the "1" key for an affirmative answer or the "2" key for a negative answer. In either case, upon depression of the appropriate "1" or "2" key in step 62 by the administrator, the respective instructions are set by computer 12 for use with system 10. The operation then returns to step 59.

If the "2" key is depressed from step 59 to indicate that the administrator desires to replace currently used voice messages with the original factory stored voice messages, system 10 proceeds to step 60 asking the administrator for confirmation, and proceeds to step 62, asking the administrator to respond by depressing the "1" key for an affirmative answer or the "2" key for a negative answer. In either case, upon depression of the appropriate "1" or "2" key in step 62 by the administrator, the respective instructions are set by computer 12 for use with system 10. The operation then returns to step 59.

If the "3" key is depressed from step 59 to indicate that the administrator desires to reset the entire system 10 to the original factory set configuration parameters, system 10 proceeds to step 68 asking the administrator for confirmation, and then proceeds to step 70 asking the administrator to respond by depressing the "1" key for an affirmative answer or the "2" key for a negative answer. In either case, upon depression of the appropriate "1" or "2" key in step 70 by the administrator, the respective instructions are set by computer 12 for use with system 10. The operation then returns to step 59.

The above operation constitutes the steps for loading of voice messages and facsimile documents into secondary storage unit 20, and for changing of parameters of system 10. With system 10 configured via the operations previously described with respect to FIG. 2., the system is now ready for operation by a system user.

Figure 3A:
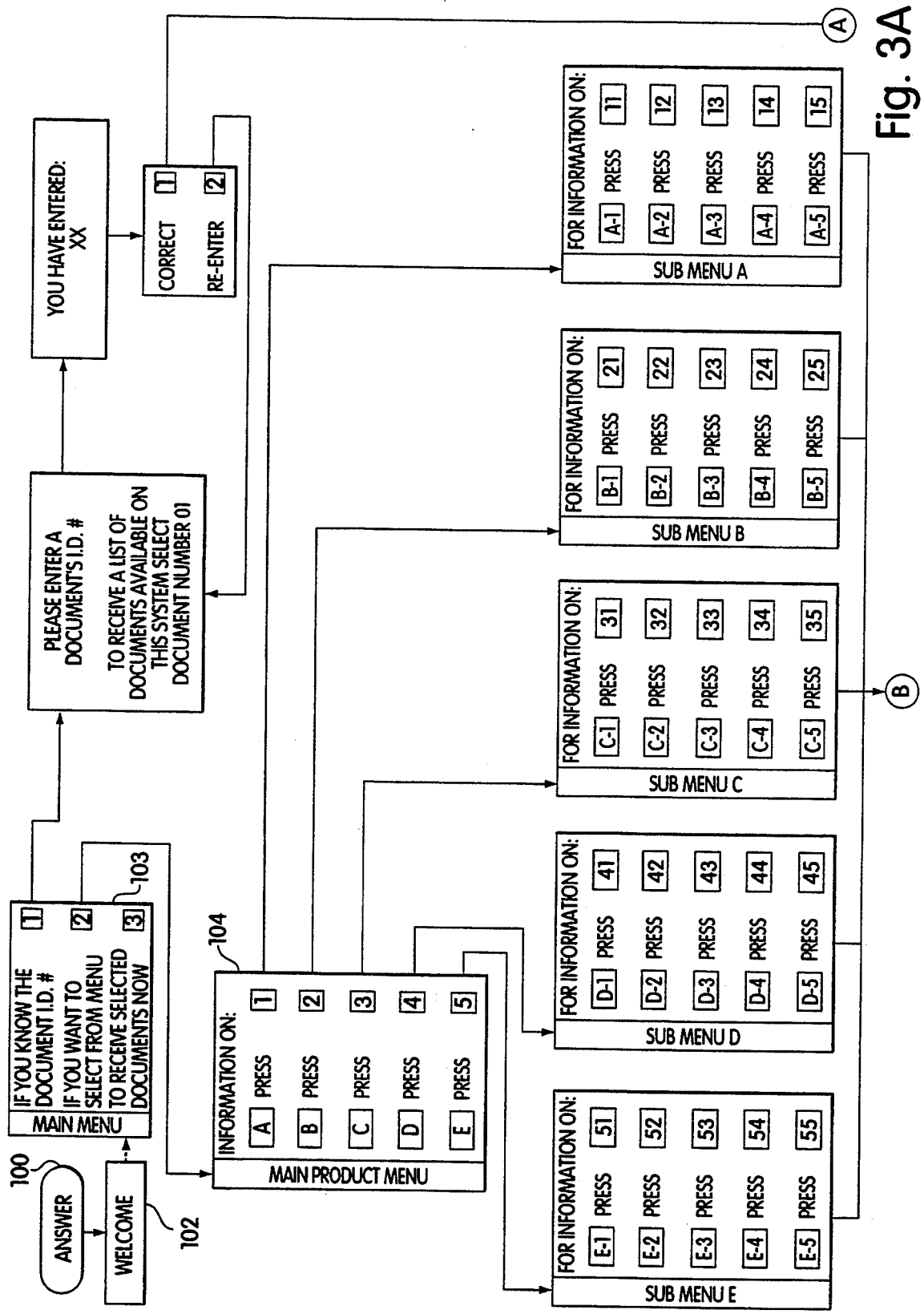
FIG. 3 is a flow chart diagram of operations which a user of the system can perform.
Figure 3B:
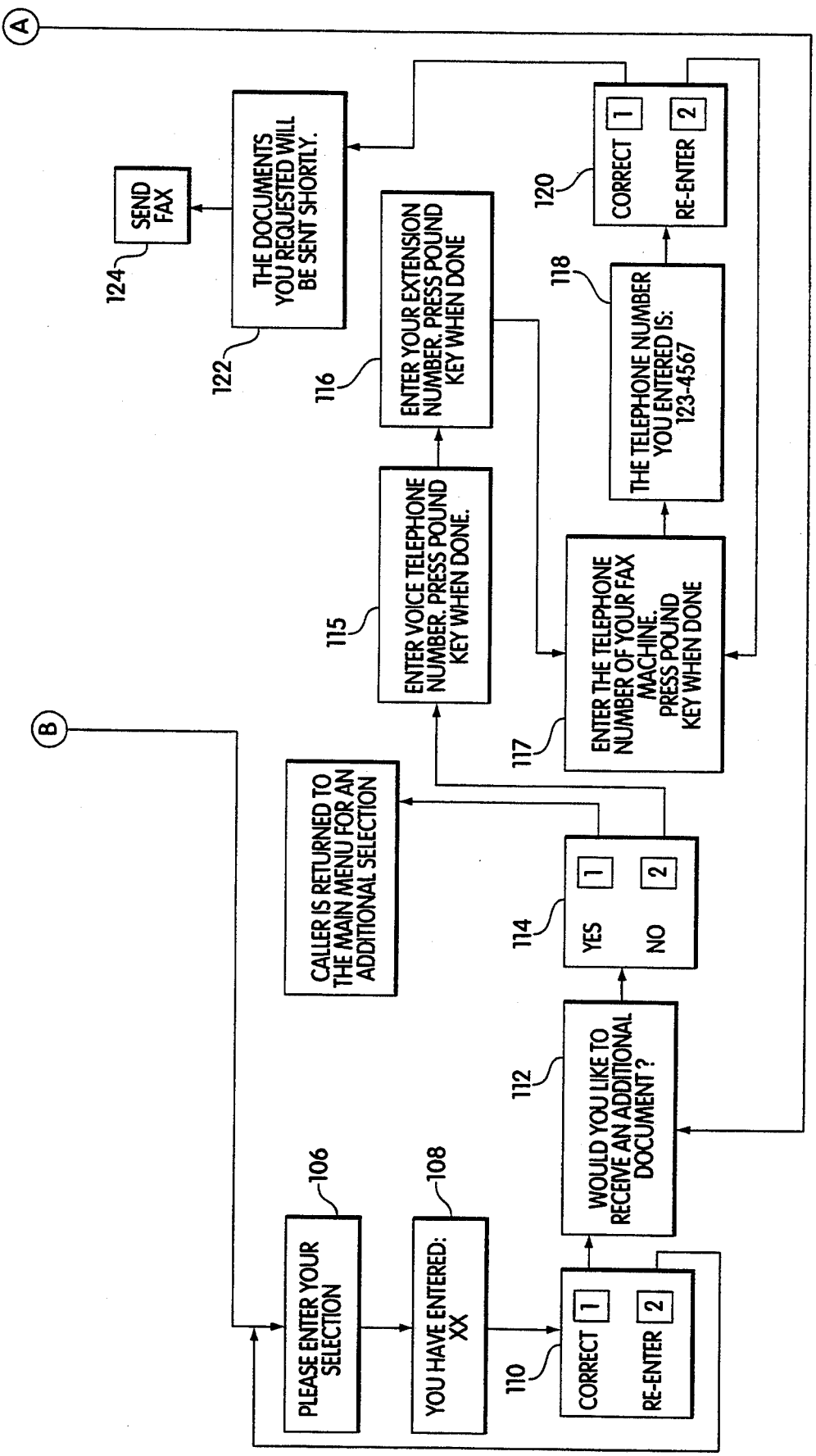

Referring to FIG. 3, when a system user dials the telephone number for system 10 from a touch-tone telephone unit (typically a remote touch-tone telephone unit, or a remote touch-tone telephone/facsimile unit), system 10 answers the telephone call in step 100 and supplies a user welcome stored voice message from secondary storage unit 20 to voice response board 18 in step 102, which transmits the message to the user's telephone unit. After the user welcome stored voice message is communicated to the user, the process proceeds to the main menu of step 103 where the user can directly select a document by depressing the "1" key (if she already knows the number of the document), or proceed to the main product menu of step 104 by depressing the "2" key. If the user depresses the "2" key from step 103, a message informs the user (at step 104) of the various categories of documents available to the user by depressing the different touch-tone keys on the user's telephone unit. For example, in a preferred embodiment, there are five categories of documents, denoted by sub-menus A through E, which can be selected by depressing one of the "1" to "5" keys, respectively, in step 104.

After depressing the appropriate key(s) in step 104, the operation continues to the particular sub-menu. In the next step 106, system 10 requests the user to enter a selection from the sub-menu by depressing the appropriate two digit keys. For example, to retrieve document E-1, the user depresses the "5" key followed by the "1" key. Then, system 10 will repeat the number entered by the user in step 108 and request the user to confirm the number by depressing "1" if correct or "2" if incorrect. In step 110, if the user depresses the "2" key, the operation returns to step 104. However, if the number is correct such that the user depresses the "1" key, the operation proceeds to step 112.

In step 112, computer 12 stores the information for processing and questions the user as to whether other documents should be retrieved. In step 114, if the user depresses the "1" key to answer in the affirmative, the process returns to the main menu at step 104. However, if the user depresses the "2" key to answer in the negative, the process continues to steps 115, 116, and 117 in which system 10 requests the user to enter the telephone number of her voice phone (steps 115 and 116) and the facsimile machine (step 117) to which the documents will be sent. (Note that steps 115 and 116 are optional but preferred. The user's voice phone number, if collected, may be subsequently used, for example, for marketing purposes.) System 10 repeats the telephone numbers to the user in step 118. In step 120, if this number is incorrect, the user depresses the "2" key and the process returns to step 115. If the number is correct, the user depresses the "1" key, and the process proceeds to step 122, where system 10 notifies the user, by means of a pre-recorded message, that the requested documents have been queued for transmission and that the user will receive them shortly. Thereafter, in step 124, system 10 dials the user's facsimile number and the documents are sent via facsimile board 16 to the user's facsimile machine.

Note that if the administrator sets the system configuration in step 56 (FIG. 2) to operate using one telephone line under the "same-call" method (i.e., one line same call), documents will be transmitted over the telephone connection already established between the user and system 10. Accordingly, instead of asking the user for the telephone number of the receiving facsimile machine (step 117 in FIG. 3), system 10 will merely request the user to press the appropriate button on her facsimile machine in order to receive the selected documents.

Host computer 12 manages the operation of system 10 and performs any required processing. The software previously described with respect to FIGS. 2 and 3 controls host computer 12. Host computer 12 also manages the transfer of data to or from facsimile board 16, voice response board 18, and secondary storage unit 20.

Automated facsimile/voice memory managing system 10 delivers comprehensive voice processing and facsimile on-demand capabilities, while using limited-capability, low cost hardware (e.g., "dumb" voice boards and facsimile boards that do not have on-board processors).

The telephone-only input/output (TOIO) interface feature of system 10 allows system 10 to be controlled by the system user and by the system administrator from a local or remote touch-tone telephone. Neither a keyboard, a monitor, nor a printer is required to operate and control system 10.

System 10 includes voice recording and playback, DTMF (dual-tone multi-frequency) detection, and facsimile transmission and reception, while maintaining its telephone-only input/output (TOIO) interface.

System 10 performs real time, multitasking operations (e.g., as described previously with reference to FIG. 4) while operating under a non-multitasking operating system such as DOS.

Figure 5:
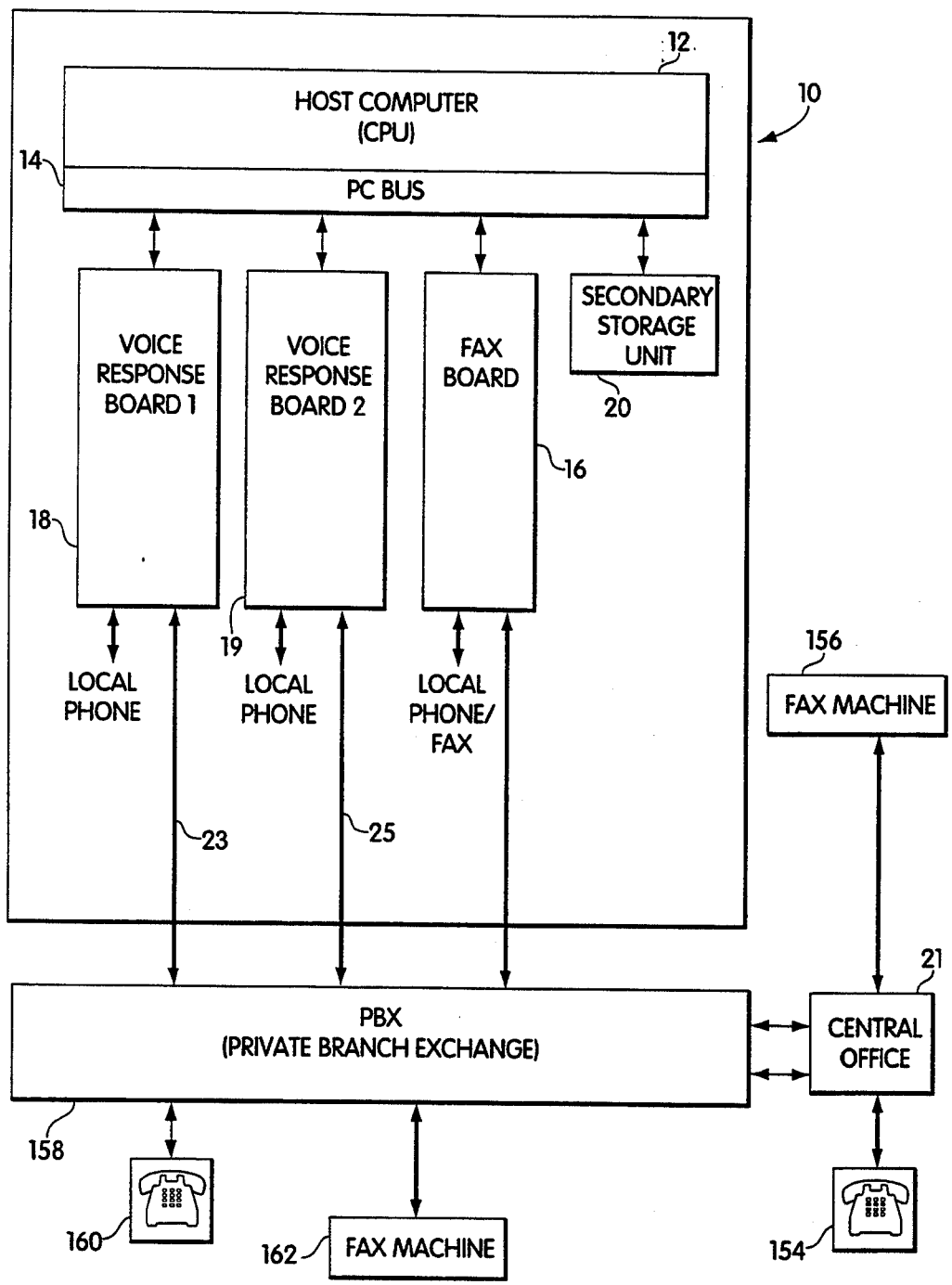
FIG. 5 is a schematic diagram of the automated facsimile/voice memory managing system which allows automatic setup.

Referring to FIG. 5, another embodiment of the invention features an automated facsimile/voice memory managing system 10 similar to the system of FIG. 1a but including a second voice response board 19 in addition to a first voice response board 18. With first voice response board 18 connected to a first industry-standard single-line extension 23 of PBX 158 and second voice response board 19 connected to a second such extension 25, system 10 can sample the PBX signaling characteristics which exist in the PBX and which occur during a telephone call from one extension (e.g., first extension 23) to another extension (e.g., second extension 25). Similar to the previous description with reference to FIGS. 1b through 1f, boards 16, 18, and 19 can be connected to central office 21 in a variety of physical configurations, one of which is shown in FIG. 5.

Sampling is initiated by commands entered from a local or remote touch-tone telephone. Generally, once sampling is initiated, the two voice response boards interact to "automatically" (i.e., without any ongoing supervision or analysis by a technician) determine the actual values of the PBX signaling characteristics. The determined values are then used by system 10 to properly interface with the standard outside telephone lines and/or a telephone switching system. The telephone switching system can include PBX 158 or central office 21 or both. Thus, this embodiment of the invention is adapted to provide a simple, user-friendly automatic setup process that determines the values of unknown PBX signaling characteristics, and uses the determined values to setup a working interface, all without the need for assistance from a trained technician.

The automatic setup process is initiated by calling system 10 via a local or remote touch-tone telephone and entering an activation command, i.e., a sequence of digits entered from the touch-tone telephone. The activation command preferably includes the digits corresponding to the extension number to which one of the voice response boards, e.g., board 19, is connected. In general, once the activation command is received by system 10, the other voice response board, e.g., board 18, dials the extension number of the former voice response board, e.g., board 19, and the two boards interact to determine the values of all of the various PBX signaling characteristics. Note that while two voice boards are required to determine the values of most of the various characteristics, at least one value can be determined with only one voice board.

Also, the facsimile board 16 can replace one of the voice boards in the automatic setup process. In this embodiment, the facsimile board 16 may be adapted to operate in conjunction with one of the voice boards to determine the values of most of the various PBX signalling characteristics, or the facsimile board 16 may be designed to operate alone to determine at least one value. Accordingly, in the following description which references FIGS. 6 through 10, facsimile board 16 may be used instead of one of the two voice boards.

The various PBX signaling characteristics may be separated into six general categories: general system characteristics, dial tone characteristics, ring characteristics, call progress ring characteristics, call progress busy characteristics, and other call progress characteristics. Each category includes at least one characteristic whose value must be determined by the automatic setup process before a working interface can be established.

Figure 6:
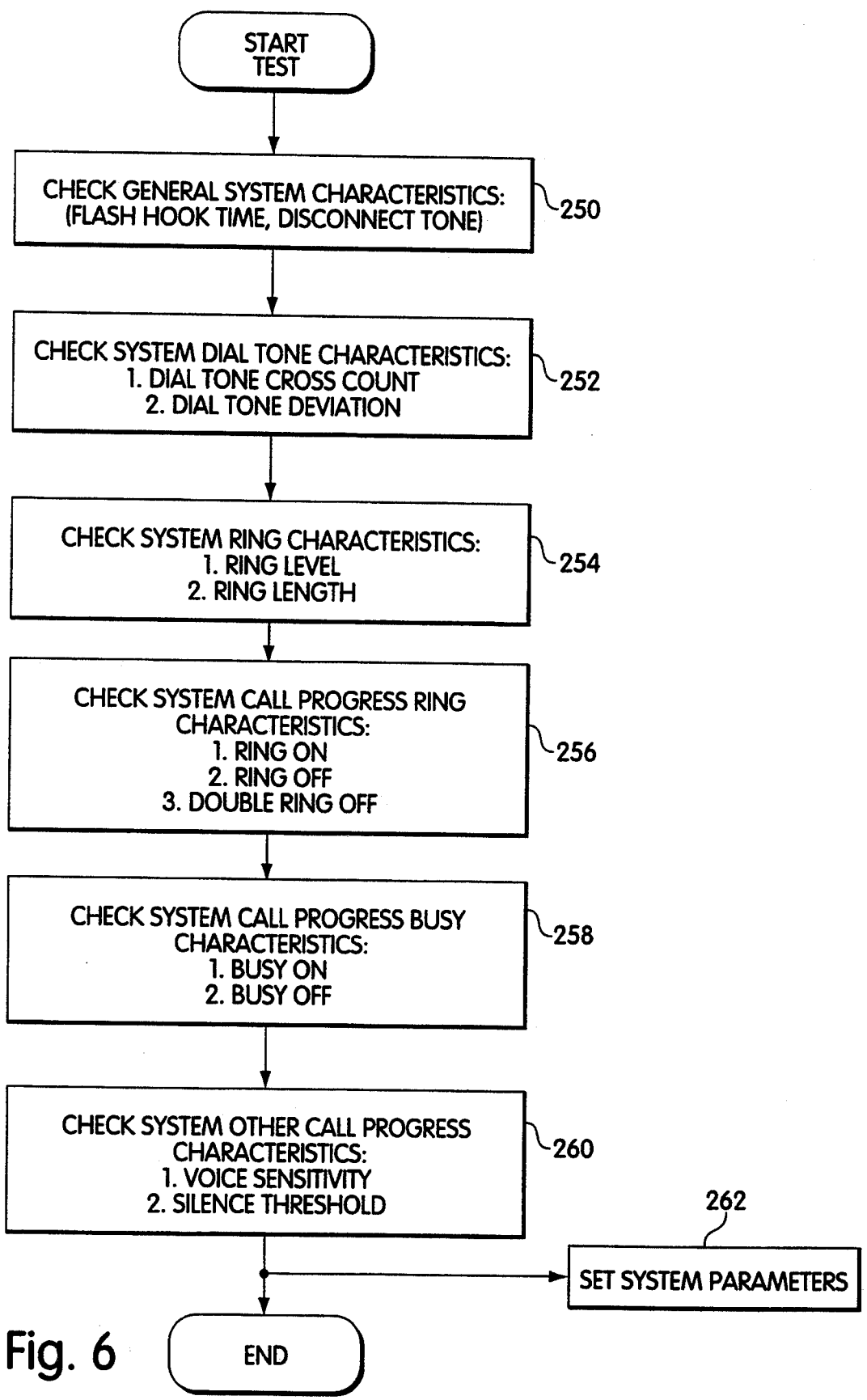
FIGS. 6 through 10 are flow chart diagrams of operations which the system can perform.

Referring to FIG. 6, once the automatic setup process is initiated, a typical order for determining the various signalling characteristics is as follows: general system characteristics (step 250), dial tone characteristics (step 252), ring characteristics (step 254), call progress ring characteristics (step 256), call progress busy characteristics (step 258), and then other call progress characteristics (260). After values are determined for the various signalling characteristics, system 10 may be used to set various system configuration parameters (step 262), as described previously with reference to FIG. 2.

Figure 7:
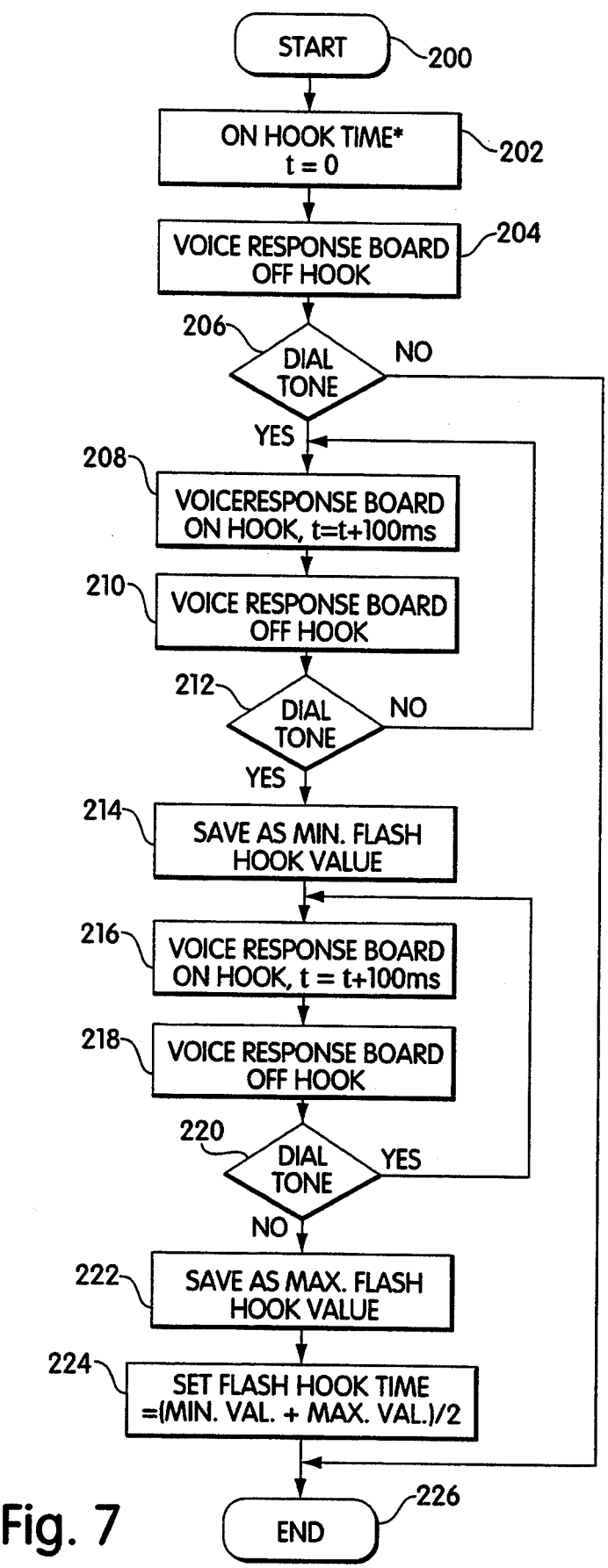

Referring to FIG. 7, the general system characteristics category includes "flash hook time." Unlike the rest of the PBX signaling characteristics, only one of the two voice response boards (e.g., board 18), or just the facsimile board 16 as described previously, is required to determine the flash hook time. The method for determining the flash hook time interval (typically measured in milliseconds) begins at step 200. At step 202, an "on hook time" variable is initialized to zero. Voice response board 18 then goes off hook and checks for dial tone (steps 204 and 206). If dial tone is present, voice response board goes back on hook (step 208) for an incremental, predetermined duration, preferably 100 milliseconds, and then goes back off hook and listens to dial tone (steps 210 and 212). This process (steps 208, 210, and 212) repeats itself until a dial tone is detected. That value of the "on hook time" is then saved as the minimum flash hook time (step 214). The process (steps 216, 218, and 220) proceeds until no dial tone is detected. That value of the "on hook time" is saved as the maximum flash-hook time (step 222). The minimum and maximum values are then added and divided by 2 to set the new system flash-hook time (step 224). The process ends at step 226.

The methods of determining the remainder of the PBX signaling characteristics will now be described. Each method described below requires two voice response boards, e.g., board 18 and board 19. As described previously, each method may also be performed with one voice response board and the facsimile board 16. The embodiment which includes the facsimile board 16 and one voice response board will not be described further but it is noted that all operations performed with the two voice response boards may also be performed with one of the voice response boards and the facsimile board 16.

The dial tone characteristics category includes "dial tone cross count" and "dial tone deviation." "Dial tone cross count" is determined by sampling the telephone line and detecting the number of zero crossings in a 32 millisecond interval. The method is as follows. Voice response board 18 goes off hook one hundred times, for a duration of 32 milliseconds each time. An average frequency is calculated from the 32 milliseconds samples and used as the dial tone cross count. This dial tone cross count value is then used to distinctly recognize a dial tone. "Dial tone deviation" is obtained from the series of consecutive dial tone cross count samples obtained in the "dial tone cross count" test by calculating the deviation from the mean. This dial tone deviation value is then used to set the error tolerance of a dial tone detection mechanism.

The ring characteristics category includes "ring level" and "ring length." "Ring level" is determined as follows. Voice response board 18 goes off hook and dials voice response board 19. Voice response board 19 monitors the line for the incoming ring signals and samples the line. The ring level is set as the mean of all samples. This ring level value is then used to determine if an incoming signal is indeed a ring. A value for "ring length" is determined by voice response board 18 going off hook and dialing voice response board 19. Voice response board 19 then monitors the line for the incoming ring signals and samples the line. The ring length is set as the mean of all samples of all ring durations. This ring length value is used to determine if an incoming ring energy should be accepted as a valid ring.

The call progress ring characteristics category includes "ring off", "ring on", and "double ring off." A value for "ring off" is determined by testing the upper limit of the length of the silence period between rings as follows. Voice response board 18 goes off hook and dials voice response board 19. Voice response board 18 monitors the line for the incoming ring signals from voice response board 19. The ring off value is set as the mean of all samples of the upper limit of the length of the silence periods between the rings. This value is then used to identify the ring signal in the call progress algorithm. A value for "ring on" is determined by testing the lower limit of the length of the silence period between rings as follows. Voice response board 18 goes off hook and dials voice response board 19. Voice response board 18 monitors the line for the incoming ring signals from voice response board 19. The ring on value is set as the mean of all samples of the lower limit of the length of the silence periods between the rings. This value is then used to efficiently identify a ring signal in the call progress algorithm. "Double ring off" is determined by recognizing the unequal intervals of silence between rings as follows. Voice response board 18 goes off hook and dials voice response board 19. Voice response board 18 monitors the line to determine if a double ring signal exists in the system by checking if unequal intervals of silence between rings are detected. If unequal intervals of silence are detected, the system is identified as a double ring system.

If double ring is detected then an additional test is performed to determine the length of the longer silence period between double rings. To determine this parameter, voice response board 18 goes off hook and dials voice response board 19. Voice response board 18 monitors the line and tests the upper limit of the length of the longer silence period between double rings that are generated by the phone system. The double ring off value is set as the mean of all samples of the upper limit of the length of the longer silence period between double rings. This value is then used to efficiently identify a double ring signal in the call progress algorithm.

The call progress busy characteristics category includes "busy on" and "busy off." A value for "busy on" is determined by testing the lower limit of the length of the tone period during busy signals as follows. Voice response board 19 goes off hook. Voice response board 18 goes off hook and dials voice response board 19. Voice response board 18 monitors the line for the incoming busy signals from voice response board 19. The busy on value is set as the mean of all samples of the lower limit of the length of the tone period between busy signals. This value is then used to efficiently identify a busy signal in the call progress algorithm. A value for "busy off" is determined by testing the upper limit of the length of the silent period during busy signals as follows. Voice response board 19 goes off hook. Voice response board 18 goes off hook and dials voice response board 19. Voice response board 18 monitors the line for the incoming busy signals from voice response board 19. The busy off value is set as the mean of all samples of the upper limit of the length of the tone period between busy signals. This value is then used to efficiently identify a busy signal in the call progress algorithm.

The other call progress characteristics category includes "voice sensitivity" and "silence threshold." A value for "voice sensitivity" is determined by testing the threshold of the call progress speech sensitivity as follows. Voice response board 18 goes off hook and samples the line one thousand times, for a duration of 32 milliseconds each time. The voice sensitivity value is set as the mean of all samples. This value is then used to evaluate whether to accept an incoming signal as voice. A value for "silence threshold" is determined by testing the noise level of the line to eliminate the false detection of a ring or busy tone as voice, as follows. Voice response board 18 goes off hook and samples the line one thousand times, for a duration of 32 milliseconds each time. The silence threshold value is set as the mean of all samples. This value is used to prevent false detection of voice as call progress tones, or to prevent the false detection of call progress tones as voice.

Figure 8:
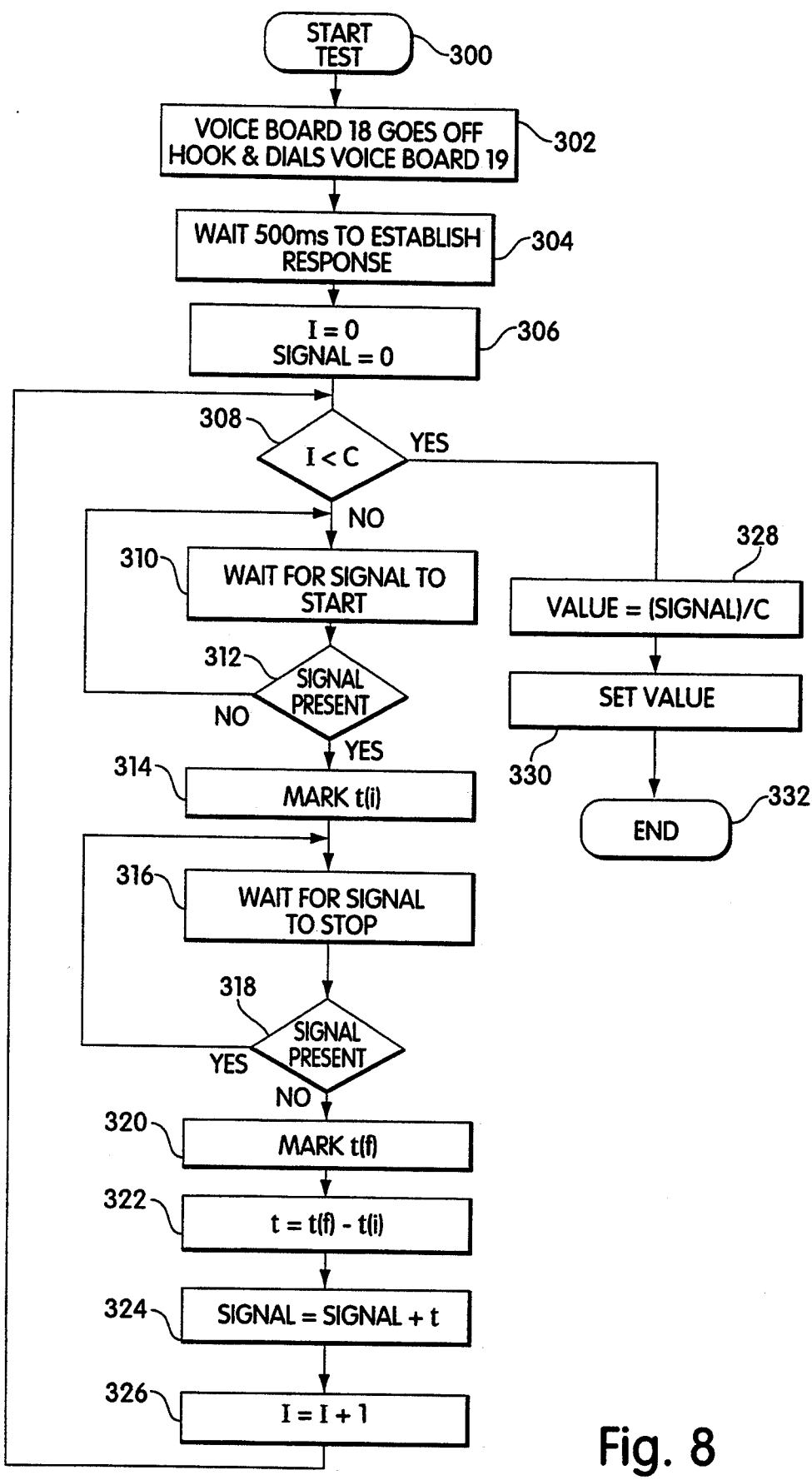

Referring to FIG. 8, a general method for determining "dial tone cross count", "ring level", "ring length", "voice sensitivity", or "silence threshold" begins at step 300. First, board 18 dials board 19 (step 302). If a response is established, the variables I and SIGNAL are reset (steps 304 and 306), where I represents the number of times the particular test has been performed and SIGNAL represents the value of the particular characteristic being tested. The variable I is then checked (step 308) to determine if it is less than the value of C which represents the number of times the particular test is to be performed. C is preferably preset and remains constant. A loop is then entered (steps 310 and 312) until a desired signal is present. When the desired signal is present, the associated time is stored as t(i) at step 314. Another loop is entered (steps 316 and 318) until the signal stops. When it stops, the associated time is stored as t(f) at step 320. The difference between t(i) and t(f) is calculated at step 322 and added to the previous determination of SIGNAL at step 324. I is then incremented (step 326) and the process returns to decision step 308. If I is greater than or equal to C, the value of the particular characteristic being tested (i.e., "dial tone cross count", "ring level", "ring length", "voice sensitivity", or "silence threshold") is calculated at step 328. The value is then set (step 330) and the process ends (step 332).

Figure 9:
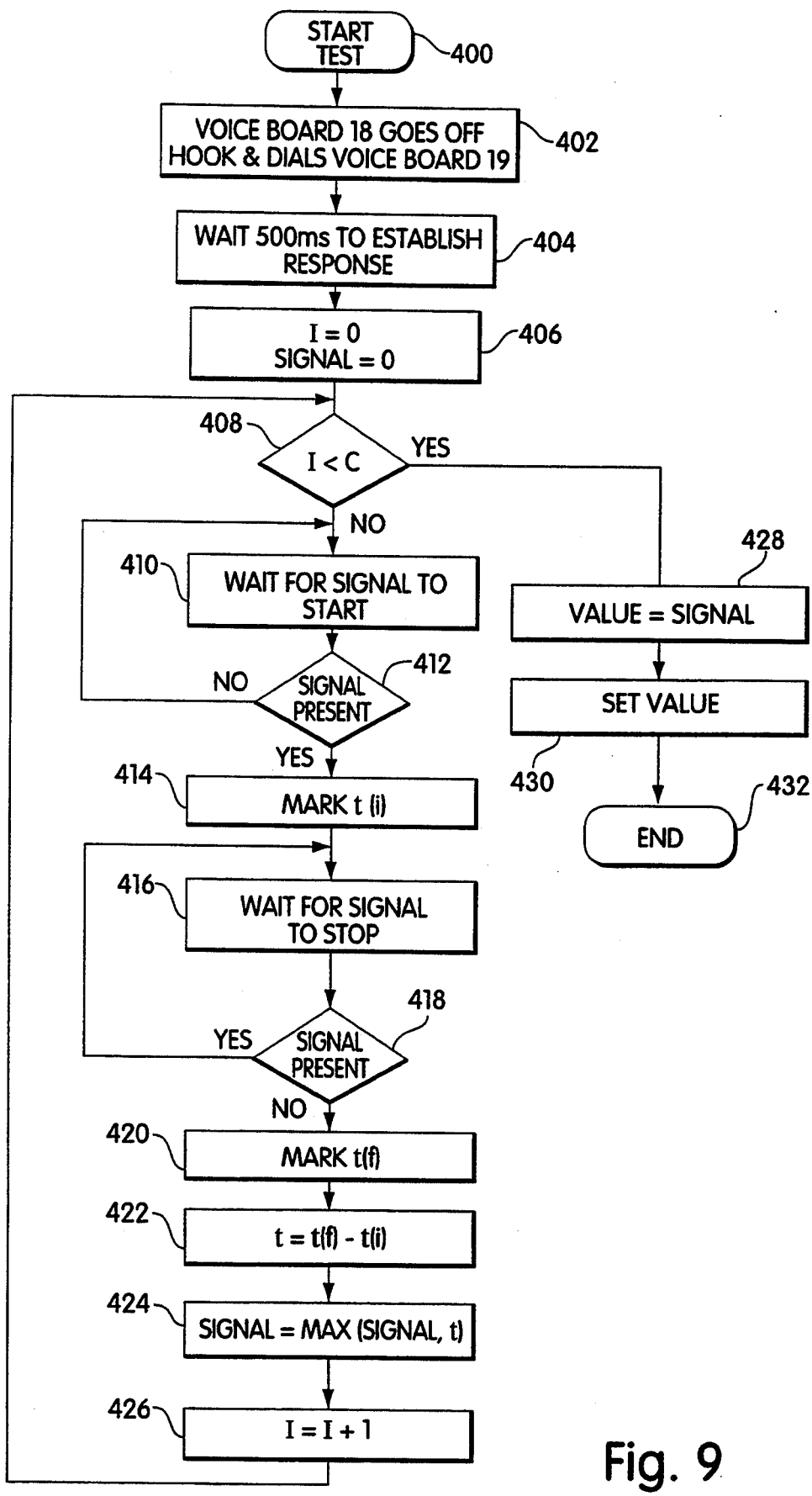

Referring to FIG. 9, a general method for determining "ring off", "double ring off", or "busy off" begins at step 400. Steps 402 through 432 generally mirror steps 302 through 332.

Figure 10:
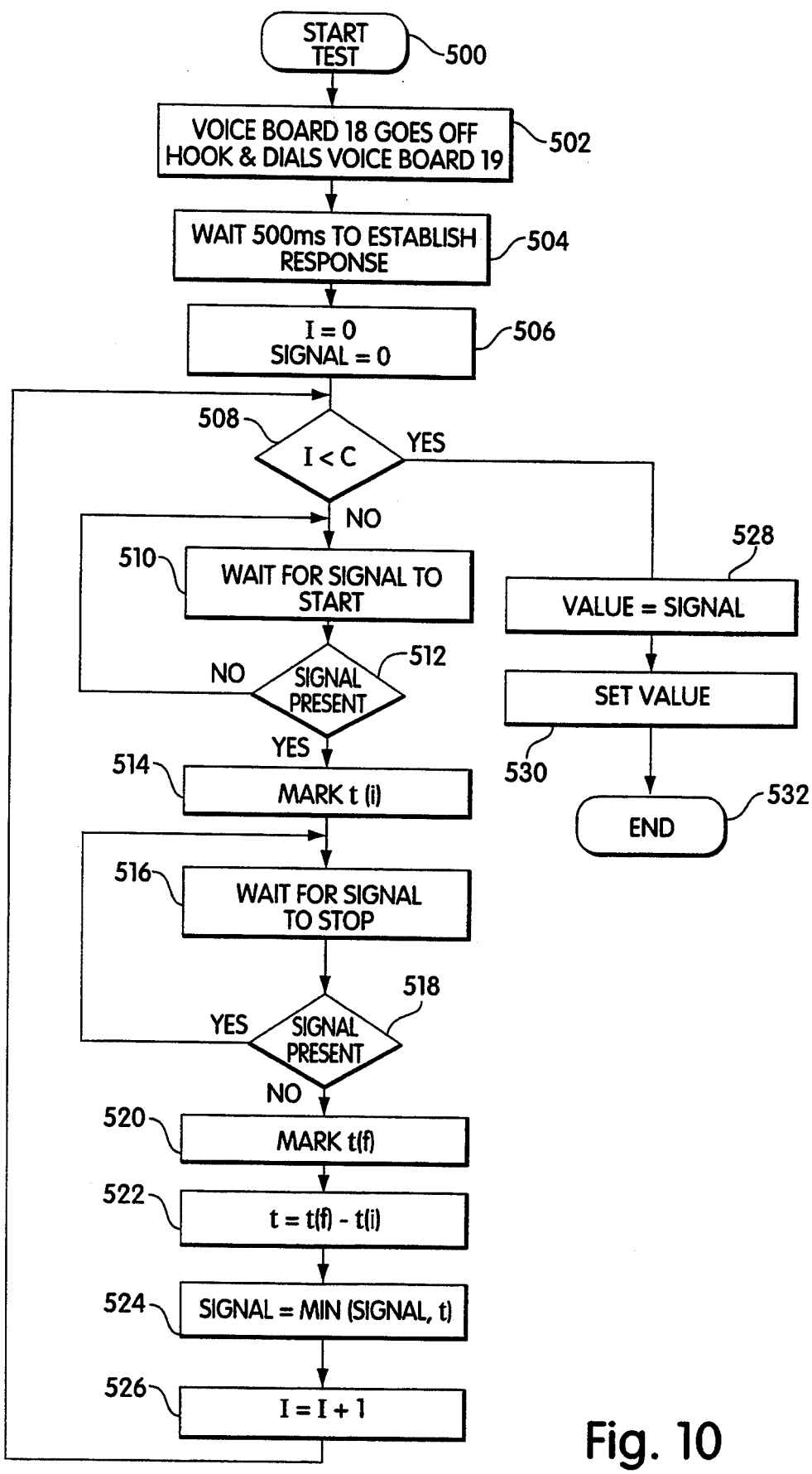

Referring to FIG. 10, a general method for determining "ring on" or "busy on" begins at step 500. Steps 502 through 532 generally mirror steps 302 through 332.

Other modifications and implementations will occur to those skilled in the art without departing from the spirit and the scope of the invention as claimed. Accordingly, the invention is to be defined not by the preceding illustrative description, but by the following claims.

What is claimed is:

1. A method for controlling an automated facsimile and voice memory managing system from a touch-tone telephone, said system having a system configuration and storage means for storing voice information and facsimile document information, said method comprising the steps of:

a) answering a telephone call made by a person from said touch-tone telephone;
   b) instructing the person by voice commands stored in said system to select different keys on said touch-tone telephone in order to perform the following steps:
      i) vary different parameters of said system configuration,
      ii) store new voice information in said system, and
      iii) store new facsimile document information in said system; and
   c) performing the following steps in response to the selection of the different keys of said touch-tone telephone by the person:
      i) changing said different parameters of said system configuration,
      ii) actuating said system to store new voice information in said system for use by a subsequent user of said system, and
      iii) actuating said system to store new facsimile document information in said system for transmission to a subsequent user of said system,
      iv) setting a maximum number of documents that can be retrieved by a user of said system during each telephone call by the user,
      v) determining whether to transmit a cover page to a user of said system during each transmission of stored facsimile document information, vi) setting a maximum number of times that said system will attempt to transmit facsimile document information to a user,
vii) determining whether facsimile document information will be sent to a user over a same telephone line utilized by the user to order the facsimile document information or over a different telephone line,
viii) setting said system to dial an outdialing prefix when required by a PBX,
ix) determining whether a facsimile document is sendable to an international telephone number,
x) setting the time of said system,
xi) setting the date of said system,
xii) replacing stored voice information with other different voice information,
xiii) replacing stored voice information with factory set default voice information, and
xiv) resetting all parameters to original stored, factory set default parameters.

2. An automated facsimile and voice memory managing system controllable from a touch-tone telephone, said system having a system configuration and storage means for storing voice information and facsimile document information, said system comprising:
   a) means for answering a telephone call made by a person from said touch-tone telephone;
   b) means for instructing the person by voice commands stored in said system to select different keys on said touch-tone telephone in order to perform the following steps:
      i) vary different parameters of said system configuration,
      ii) store new voice information in said system, and
      iii) store new facsimile document information in said system; and
   c) means for performing the following steps in response to the selection of the different keys of said touch-tone telephone by the person:
      i) changing said different parameters of said system configuration,
      ii) actuating said system to store new voice information in said system for use by a subsequent user of said system, and
      iii) actuating said system to store new facsimile document information in said system for transmission to a subsequent user of said system,
      iv) setting a maximum number of documents that can be retrieved by a user of said system during each telephone call by the user,
      v) determining whether to transmit a cover page to a user of said system during each transmission of stored facsimile document information,
      vi) setting a maximum number of times that said system will attempt to transmit facsimile document information to a user,
      vii) determining whether facsimile document information will be sent to a user over a same telephone line utilized by the user to order the facsimile document information or over a different telephone line,
      viii) setting said system to dial an outdialing prefix when required by a PBX,
      ix) determining whether a facsimile document is sendable to an international telephone number,
      x) setting the time of said system,
      xi) setting the date of said system,
      xii) replacing stored voice information with other different voice information,
      xiii) replacing stored voice information with factory set default voice information, and
      xiv) resetting all parameters to original stored, factory set default parameters.

* * * * *